US012699655B2

(12) United States Patent
Menon et al.

(10) Patent No.: US 12,699,655 B2
(45) Date of Patent: Aug. 4, 2026

(54) SYSTEMS AND METHODS FOR LOOPING DYNAMIC MEMORY ACCESS OPERATIONS

(71) Applicant: SambaNova Systems, Inc., Palo Alto, CA (US)

(72) Inventors: Amitabh Menon, Palo Alto, CA (US); Manish K. Shah, Austin, TX (US); Paul Jordan, Austin, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 19/001,465

(22) Filed: Dec. 25, 2024

(65) Prior Publication Data

US 2026/0178509 A1 Jun. 25, 2026

(51) Int. Cl.
*G06F 12/1081* (2016.01)
*G06F 12/0842* (2016.01)

(52) U.S. Cl.
CPC ...... *G06F 12/1081* (2013.01); *G06F 12/0842* (2013.01)

(58) Field of Classification Search
CPC .......................... G06F 12/1081; G06F 12/0842
See application file for complete search history.

(56) References Cited

U.S. PATENT DOCUMENTS

2019/0370631 A1 12/2019 Fais et al.

FOREIGN PATENT DOCUMENTS

| CN | 114979022 | A | * | 8/2022 | ............. | H04L 49/90 |
| CN | 118210637 | A | * | 6/2024 | ............. | G06F 9/544 |
| CN | 120561038 | A | * | 8/2025 | ......... | G06F 13/4282 |
| DE | 102023207958 | A1 | * | 3/2024 | ....... | G06F 15/17331 |

OTHER PUBLICATIONS

Translation of DE-102023207958-A1 (Year: 2023).*
Translation of CN-120561038-A (Year: 2025).*
Translation of CN-118210637-A (Year: 2024).*
Translation of CN-114979022-A (Year: 2022).*
Koeplinger et al., Spatial: A Language and Compiler for Application Accelerators, PLDI '18, Jun. 18-22, 2018, Association for Computing Machinery, 16 pages.

(Continued)

*Primary Examiner* — Henry Tsai
*Assistant Examiner* — John B Roche
(74) *Attorney, Agent, or Firm* — FP Patents; Sikander M. Khan; Richard Krukar

(57) ABSTRACT

A DMA engine may process a work queue (WQ) configured to store work queue elements (WQEs). A processor may write a work queue element (WQE) to the WQ, the WQE including a jump_wait indicator. The DMA engine may be configured to enter a jump_pause state in response to processing the WQE and determining that the jump_wait indicator is set. The DMA engine may be configured to identify a one of the WQEs based at least in part on a jump offset in a trigger message. The DMA engine may be configured to enter a run state and to begin processing the one of the WQEs in response to receiving the trigger message. The DMA engine may be configured to transfer a block of data between a memory and a network interface in response to processing the one of the WQEs.

20 Claims, 19 Drawing Sheets

(56) References Cited

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

NVIDIA Spectrum-X Network Platform Architecture, NVIDIA, May 28, 2023, 26 pages.

Podobas et al, A Survey on Coarse-Grained Reconfigurable Architectures From a Performance Perspective, IEEEAccess, vol. 20203012084, Jul. 27, 2020, 25 pages.

Prabhakar et al., Plasticine: A Reconfigurable Architecture for Parallel Patterns, ISCA, Jun. 24-28 2017, 14 pages.

* cited by examiner

Ethernet DMA (E-DMA) Write Operation

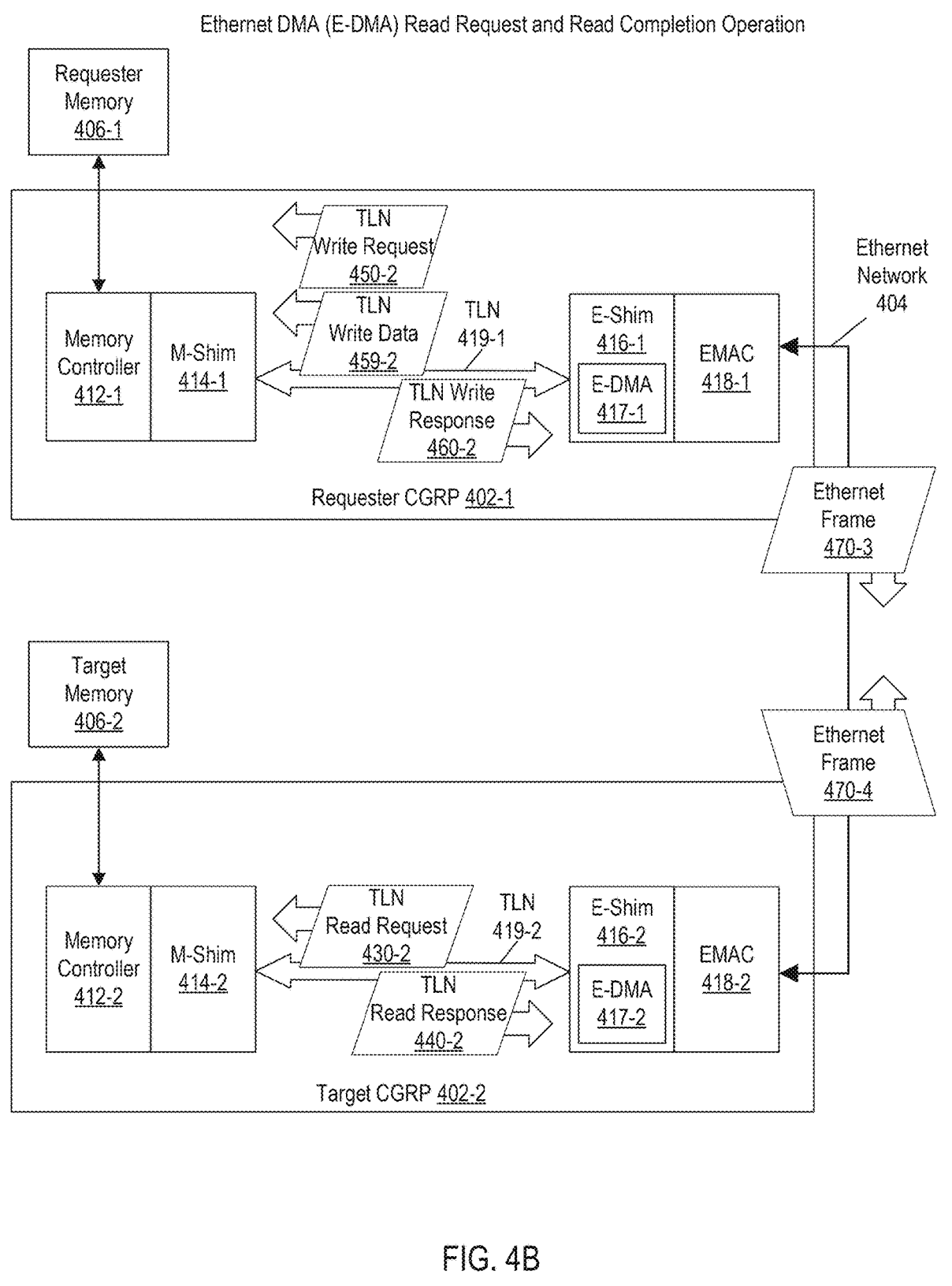

Ethernet DMA (E-DMA) Read Request and Read Completion Operation

Requester Memory
406-1

TLN
Write Request
450-2

TLN
Write Data
459-2

TLN
419-1

E-Shim
416-1

Memory Controller
412-1

M-Shim
414-1

TLN Write Response
460-2

E-DMA
417-1

EMAC
418-1

Ethernet Network
404

Requester CGRP 402-1

Ethernet Frame
470-3

Target Memory
406-2

Ethernet Frame
470-4

Memory Controller
412-2

M-Shim
414-2

TLN
Read Request
430-2

TLN
419-2

E-Shim
416-2

TLN
Read Response
440-2

E-DMA
417-2

EMAC
418-2

Target CGRP 402-2

FIG. 4B

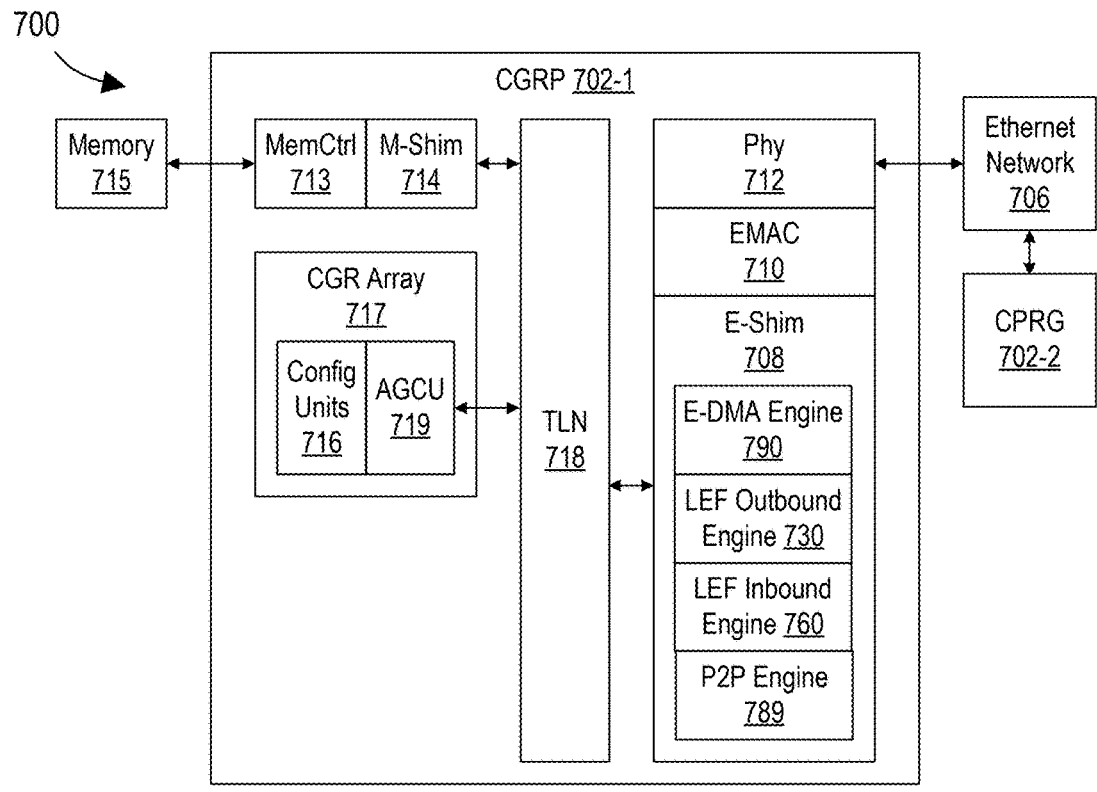
FIG. 7A
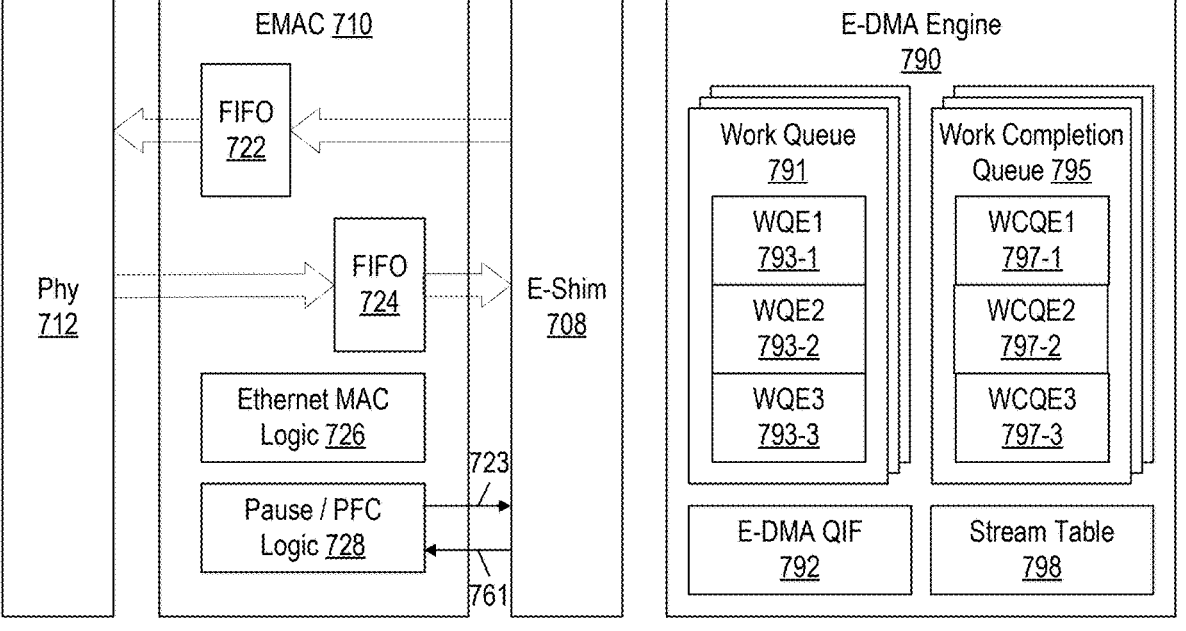
FIG. 7B                        FIG. 7C

1000

1002

Read a work queue element (WQE) that is in a work queue configured to store a plurality of WQEs.

1004

Enter a jump_pause state in response to processing the WQE and determining that a jump_wait indicator in the WQE is set

1006

Use a jump offset included in a trigger message to identify a one of the WQEs in response to receiving the trigger message.

1008

Enter a run state and beginning to process the one of the WQEs in response to receiving the trigger message.

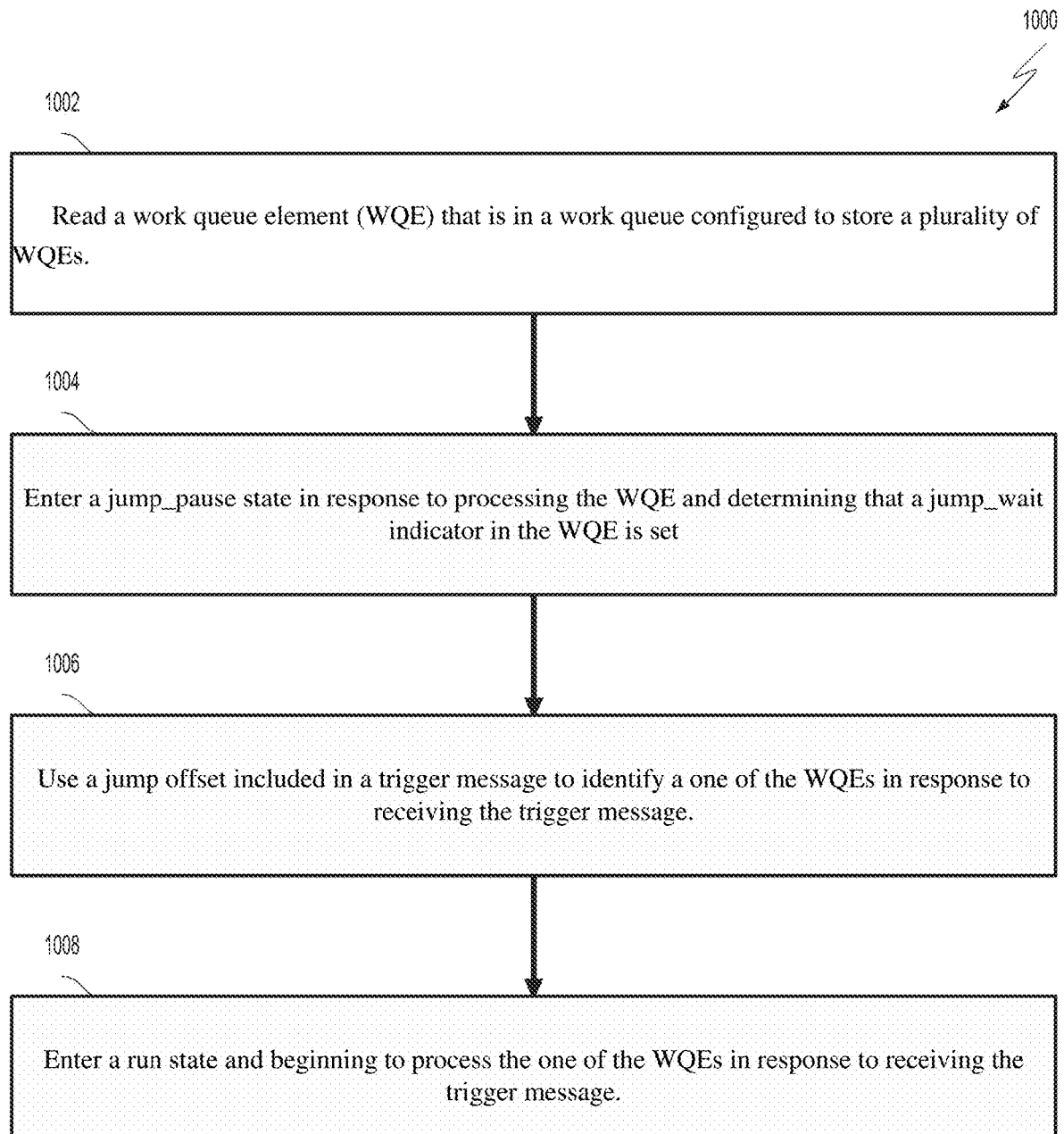

SYSTEMS AND METHODS FOR LOOPING DYNAMIC MEMORY ACCESS OPERATIONS

TECHNICAL FIELD

The present subject matter relates to communication between integrated circuits, queues, hardware implemented queue, direct memory access (DMA) memory reads and writes, remote direct memory access (RDMA) memory reads and write, and more specifically to inter-die and intra-die communication between processing arrays.

BACKGROUND

Reconfigurable processors, including field programmable gate arrays (FPGAs), can be configured to implement a variety of functions more efficiently or faster than might be achieved using a general-purpose processor executing a computer program. So called Coarse-Grained Reconfigurable Architectures (e.g., CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence (AI) workloads. A CGRA can include one or more reconfigurable processor (CGRP) and each CGRP can be coupled to a memory that may be dedicated to that particular CGRP. Numerous CGRPs may be allocated to a single workload. For example, a large scale transformer model having tens or hundreds of billions of parameters may be mapped onto multiple CGRPs on multiple dies on multiple servers. The processing for such a model may require sharing intermediate results between CGRPs, between dies, and even between servers. Systems and methods for efficiently and rapidly sharing data within a CGRA are needed.

BRIEF SUMMARY

A CGRP may be configured to implement artificial intelligence (AI) algorithms that use billions of operands. It follows that each mathematical operation used in AI may involve an immense number of operands. An example of such an operation is the multiplication of very large matrices as may be required for AI applications. The outputs of one large scale mathematical operation (e.g., matrix multiplication, vector products, etc.) may be the inputs to a second large scale mathematical operation. For example, one large scale mathematical operation may be a vector outer product that requires one or more processors to execute a loop in which sequences operands are read from sequential memory locations and the results written to sequential memory locations. Direct memory access (DMA) operations may be used to copy the results from their current location to another memory location for use in a second large scale mathematical operation. Those familiar with high performance computing are familiar with DMA operations such as DMA block transfer operations that may be implemented using established technologies like InfiniBand remote DMA (RDMA), RDMA over converged ethernet (RoCE), etc.

The mathematical operations often include the same read-calculate-copy sequence using the exact same set of memory locations. The read-calculate-copy sequence may read thousands of input values into thousands of memory locations in a local memory, loop through those memory locations while writing the output results to thousands of other memory locations in the local memory, and then copy the results from the local memory to a second memory for use by a subsequent operation. The read and copy aspects of the sequence often includes a series of DMA operations. As such, the read-calculate-copy sequence may be more accurately described as a DMA in—calculate—DMA out sequence. A DMA engine may copy the results to the second memory by processing a series of work queue entries (WQEs) that are stored in a work queue (WQ). The WQEs may be DMA block transfer WQEs that each instruct the DMA engine to transfer a block of the results to the second memory. In the past, DMA block transfer WQEs were written to the WQ as the results were produced. The DMA engine then processed the WQEs and thereby copied the results to the second memory. It has been observed that the DMA block transfer WQEs are often the same for a series of DMA in-calculate-DMA out sequences. As such, a technique has been developed for reusing DMA block transfer WQEs such that new DMA transfer WQEs are not required for every read-calculate-write sequence. The technique involves using "jump wait WQEs" to implement loops such that the DMA engine may process a series of WQEs to copy a first set of results from specific local memory locations and then loop back and process those same WQEs again when a second set of results is available in those specific local memory locations.

BRIEF DESCRIPTION OF DRAWINGS

FIG. 4B illustrates an example of an E-DMA read request and read completion operation using the E-Shim lossless protocol, according to some aspects.

FIG. 7A is a simplified block diagram illustrating an example of a CGRA system configured to implement looping memory-to-memory direct memory access (DMA) operations, according to some aspects.

FIG. 7B is a block diagram showing more detail of the ethernet media access controller (EMAC) illustrated in FIG. 7A, according to some aspects.

FIG. 7C is a block diagram showing more detail of the E-DMA engine illustrated in FIG. 7A, according to some aspects.

FIG. 10 is a high level flow diagram illustrating an example of a method for looping dynamic memory access operations, according to some aspects.

DETAILED DESCRIPTION

Figure 1:
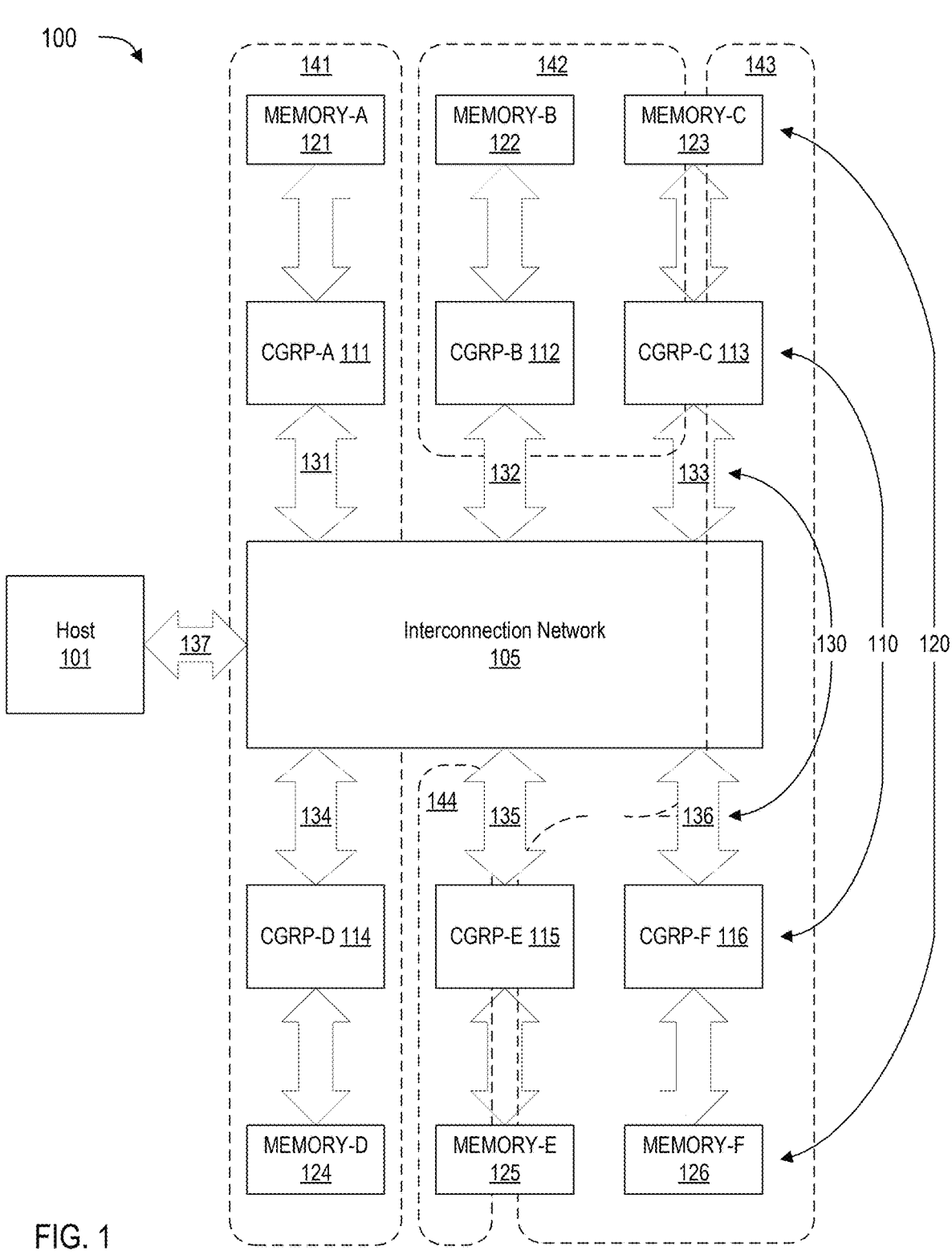
FIG. 1 is a block diagram illustrating an example of a coarse-grained reconfigurable (CGR) architecture (CGRA) system configured to implement looping memory-to-memory direct memory access (DMA) operations, according to some aspects.

The present disclosure describes systems and methods for looping dynamic memory access (DMA) operations. The systems and methods may be implemented within coarse-grained reconfigurable architectures (CGRAs).

As used herein, a reference numeral that includes a hyphenated numeric suffix (for example, 402-1, 402-2, 470-1, 470-2, 470-3, 470-4, 471-1, 708-2, or 790-1) identifies a specific instance of an element that is depicted generically in the drawings by the corresponding base reference numeral (for example, 402, 470, 471, 708, or 790). A reference numeral that includes an alphabetic suffix (for example, 506A, 738A, or 742A) identifies a specific instance of an element that is depicted or described generically by the corresponding base reference numeral (for example, 506, 738, or 742). A base reference numeral used without a suffix (for example, 402, 406, 416, 430, 440, 450, 459, 471, 708, 738, 742, or 790) refers to the element generically, or to any one or more instances thereof. Each such base reference numeral appears in the drawings.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

The following detailed description describes technology and techniques for looping DMA operations, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted to avoid obscuring other technical details. The present disclosure is not intended to be limited to the described or illustrated examples, but to be accorded the widest scope consistent with the described principles and features.

A system that implements looped dynamic memory access (DMA) operations is disclosed herein. The system is described within the context of an example. The example is a CGRA system configured to implement looping DMA operations. The CGRA system may comprise multiple coarse-grained reconfigurable processors (CGRPs), where nodes of a dataflow graph can be split across the multiple CGRPs. Communication between the CGRPs may be achieved using Ethernet DMA (E-DMA) transactions which are implemented as a layer on the top of the Ethernet frame of Ethernet and transferred over the Layer 2 Ethernet network by encapsulating the E-DMA transactions in the Ethernet frame payload. In some implementations, the E-DMA transactions over Ethernet may be implemented using user datagram protocol (UDP) packets. Units on the internal intra-die networks in the CGRP include specific functionality to support E-DMA transactions.

Communication between CGRPs may include communication between a CGRP and another CGRP, communication between a node of a dataflow graph mapped onto a CGRP and another node of the dataflow graph mapped onto another CGRP, and communication between a node of a dataflow graph mapped onto a CGRP and another CGRP. For example, a destination CGRP may send a message to a node on the internal intra-die network of the destination CGRP indicating that the E-DMA data of a current write E-DMA transaction has been written to a local memory of the other CGRP and is available in the local memory. The availability of the E-DMA data may resolve a dependency for the node, which may trigger the node to perform a computation using the E-DMA data. As another example, after the current E-DMA transaction has completed on a destination CGRP, the destination CGRP may send a message to the initiating CGRP indicating that the transfer of the E-DMA data from the initiating CGRP to the destination CGRP has been completed. The message sent from the destination CGRP to the initiating CGRP may trigger the initiating CGRP to process the next E-DMA transaction following the current E-DMA transaction that has just been completed.

FIG. 1 is a block diagram illustrating an example of a coarse-grained reconfigurable (CGR) architecture (CGRA) system 100 configured to implement looping memory-to-memory direct memory access (DMA) operations, according to some aspects. The examples illustrated herein may be implemented in or deployed as a CGRA system 100 such as the example illustrated in FIG. 1. As illustrated, the CGRA system 100 includes a host 101, a number of coarse grained reconfigurable processors (CGRPs) 110 (111-116), an interconnection network 105 and communication links 130 (131-137) that connect the host 101 and the CGRPs 110 to the interconnection network 105. The illustrated host 101 may be, or include, a computer such as further described with reference to FIG. 11. Host 101 runs runtime processes, as further referenced herein, and may also run other computer programs, such as a compiler. In some implementations, the compiler may run on a computer that is similar to the computer described with reference to FIG. 11 but separate from host 101. The CGRA system 100 may also include memories 120 respectively coupled to the CGRPs 110 including memory-A 121 coupled to CGRP-A 111, memory-B 122 coupled to CGRP-B 112, memory-C 123 coupled to CGRP-C 113, memory-D 124 coupled to CGRP-D 114, memory-E 125 coupled to CGRP-E 115, and memory -F 126 coupled to CGRP-F 116. The memories 120 can be any type of memory, including dynamic data rate (DDR) dynamic random-access memory (DRAM), high-bandwidth memory (HBM), static memory, or flash memory.

The communication links 130 can be any type of communication link, parallel or serial, electrical or optical, but in some implementations, each may be one or more physical Ethernet links. The Ethernet links may be compliant with any version of the Ethernet specification. The interconnection network 120 may have any type of topology depending on the system design. In some implementations, the interconnection network 120 may be implemented as direct links between pairs of devices where each device is one of CGRP 111-116 or host 101. For example, the host may have 6 individual links that respectively directly connect to the 6 CGRPs 111-116 and each CGRP may, in addition to its link connecting to the host 101, have a link to each of the other CGRPs 111-116. In that implementation, CGRP-A 111 has a first link connecting directly to the host 101, a second link connecting directly to CGRP-B 112, a third link connecting directly to CGRP-C 113, a fourth link connecting directly to CGRP-D 114, a fifth link connecting directly to CGRP-E 115, and a sixth link connecting directly to CGRP-F 116; so link 131 may include 6 individual links. In other examples, the interconnection network 120 may include a bus structure, a switching fabric, or one or more switches and/or routers that are able to route a transaction from an originating CGRP 110 or host 101 to a destination CGRP 110 or host 101.

Each of the CGRPs 110 may include a grid of compute units and memory units interconnected with an internal switching array fabric such as those detailed elsewhere in this specification. The CGRPs 110 may be configured by downloading configuration files from the host 101 to configure the CGRPs 110 to execute one or more graphs 140 that define dataflow computations, and can implement any type of functionality including, but not limited to neural networks. The communication links 130 and the interconnect network 101 provide a high degree of connectivity that can increase the dataflow bandwidth between the CGRPs 110 and enable the CGRPs 110 to cooperatively process large volumes of data via the dataflow operations specified in the execution graphs 141-144.

A set of graphs 141-144 can be assigned to the CGRA system 100 for execution. The graphs 141-144 are overlaid on the block diagram of the CGRA system 100 showing how they may be assigned to the CGRPs 110. In the example shown, graph1 141 is assigned to CGRP-A 111 and CGRP-D 114, graph2 142 is assigned to CGRP-B 112 and sections of CGRP-C 113, graph3 143 is assigned to sections of CGRP-C 113, CGRP-F 116, and sections of CGRP-E 115, while graph4 144 is assigned to sections of CGRP-E 115. While the set of graphs 141-144 is statically depicted, one of skill in the art will appreciate that the execution graphs are likely not synchronous (i.e., of the same duration) and that the partitioning within a CGR computing environment will likely be dynamic as execution graphs are completed and replaced.

As can be understood from FIG. 1, nodes of a graph may be distributed across multiple CGRPs. Nodes of a graph within a CGRP may communicate using internal communication paths of the CGRP, but communication between nodes of a single graph in different CGRPs may use Ethernet direct memory access (E-DMA) or peer-to-peer (P2P) communication over the links 130 and interconnection network 105.

FIG. 1 shows an example of graph1 141 spread across multiple CGRPs with CGRP-A 111 configured to execute a first node of the graph1 141, and another CGRP-D 114 configured to execute a second node of the same graph1 141. The first node of graph1 141 may send data to the second node of graph1 141. For the purposes of this disclosure, in a typical system, a connected processor of host 101, such as processor 1120 further described with reference to FIG. 11, may be used to move the data from the first node to the second node. In contrast to a typical system, a CGRA system may allow CGRP-A 111 to send the data from the first node directly to CGRP-D 114 without passing through the host 101.

As mentioned above, the host 101 may configure the CGRPs 110 by downloading configuration bit files to the CGRPs 110. This may be accomplished by sending the configuration bit files over the communication links 130 and interconnection network 105. The configuration bit files can include information to configure individual units within the CGRPs 110 (which are described in more detail below) as well as the internal communication paths between those units. The configuration bit files may be static for the duration of execution of a graph and configure a portion of one of CGRPs 111-116 (or the entire CGRP) to execute one or more nodes of an execution graph 141-144. Although the detailed description is focused on looping dynamic memory access (DMA) operations, other functionality is envisioned to be covered by the described subject matter. Discussion of looping memory-to-memory direct memory access (DMA) operations is not intended to limit the detailed description to looping dynamic memory access (DMA) operations or to limit the detailed description in any way.

Figure 2:
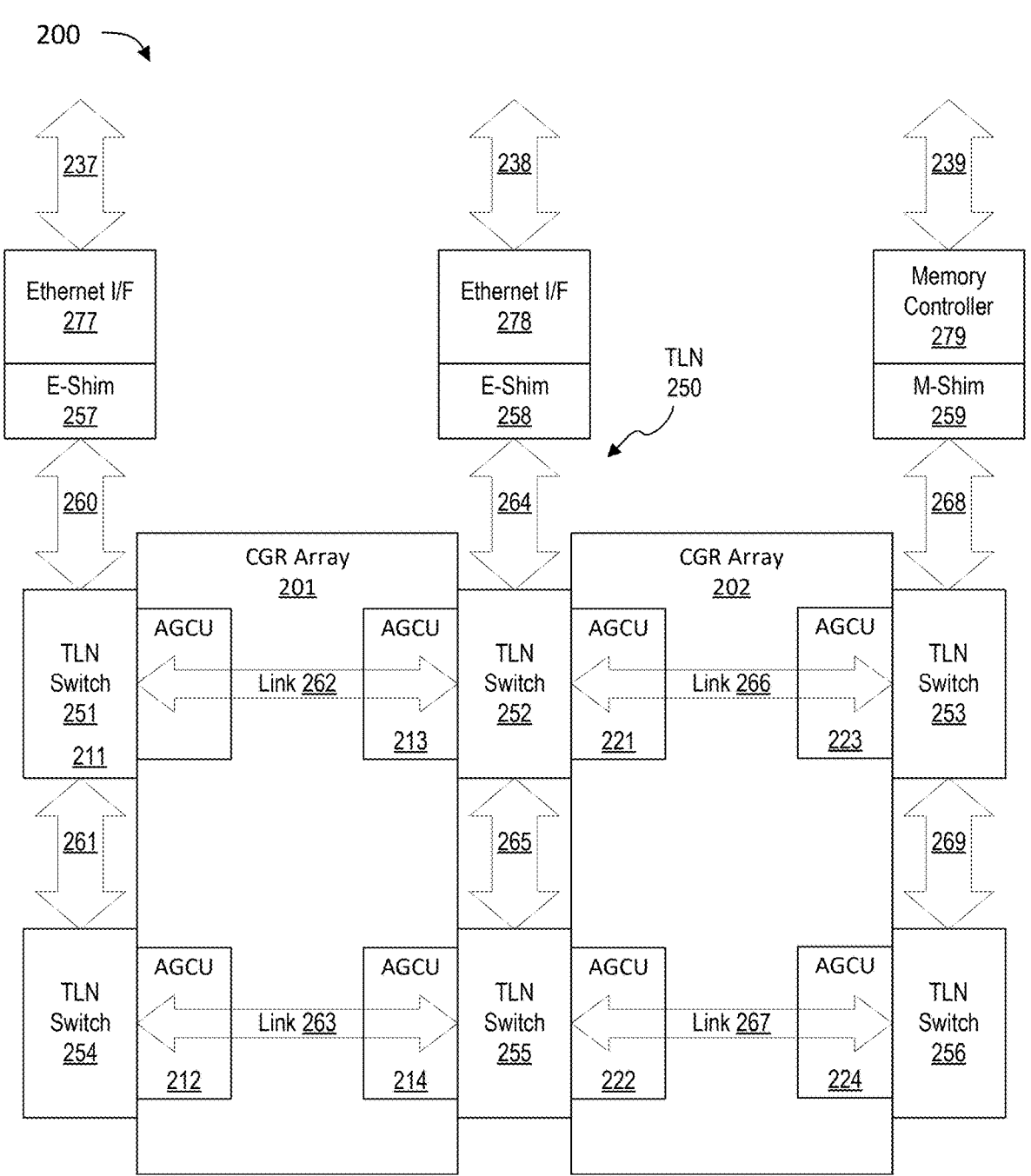
FIG. 2 is a simplified block diagram illustrating an example of a CGR processor (CGRP) having a CGRA, according to some aspects.

FIG. 2 is a simplified block diagram illustrating an example of a CGR processor (CGRP) 200 having a CGRA, according to some aspects. CGRP 200 may be used as CGRP 111-116 in the CGRA system 100 of FIG. 1. In this example, the CGRP 200 has 2 CGR arrays (CGR array 201, CGR array 202), although other implementations can have any number of CGR arrays, including a single CGR array. Each CGR array 201, 202 (which is shown in more detail in FIG.

3) comprises an array of configurable units connected by an array-level network (ALN) in this example. Each of the two CGR arrays 201 and 202 has one or more address generation and coalescing units (AGCUs) 211-214, 221-224. The AGCUs are nodes on both a top-level network (TLN) 250 and on ALNs within their respective CGR arrays 201, 202 and include resources for routing data among nodes on the TLN 250 and nodes on the ALN in each CGR array 201, 202.

The CGR arrays 201-202 are coupled to TLN 250 that includes TLN switches 251-256 and links 260-269 that allow for communication between elements of CGR array 201, elements of CGR array 202, and shims to other functions of the CGRP 200 including Ethernet shims (E-Shims) 257, 258 and a memory shim (M-Shim) 259. The M-Shim 259 can support any type of memory including dynamic data rate (DDR) dynamic random-access memory (DRAM), high-bandwidth memory (HBM), static memory, or flash memory.

Other functions of the CGRP 200 may connect to the TLN 250 in different implementations, such as additional shims to additional and or different input/output (I/O) interfaces and memory controllers, and other chip logic such as control/status registers (CSRs), configuration controllers, or other functions. Data travel in packets between the devices (including TLN switches 251-256) on the links 260-269 of the TLN 250. For example, TLN switches 251 and 252 are connected by a link 262, TLN switches 251 and E-Shim 257 are connected by a link 260, TLN switches 251 and 254 are connected by a link 261, and TLN switch 253 and M-Shim 259 are connected by a link 268.

The TLN 250 is a packet-switched mesh network with four independent networks operating in parallel; a request network, a data network, a response network, and a credit network. While FIG. 2 shows a specific set of switches and links, various implementations may have different numbers and arrangements of switches and links. All four networks (request, data, response, and credit) follow the same protocol. The only difference between the four networks is the size and format of their payload packets. A TLN transaction consists of four parts, a valid signal, a header, a packet, and a credit signal. To initiate a transaction, a TLN agent (the driver) can assert the valid signal and drive the header on the link connected to a receiver. The header consists of the node ID of the source and destination. Note that source and destination refer to the endpoints of the overall transaction, not the ID of an intermediate agent such as a switch. In the following cycle, the agent will drive the packet. The credit signal is driven by the receiver back to the driver when it has dequeued the transaction from its internal queues. TLN agents have input queues to buffer incoming transactions. Hop credits are assigned to drivers based on the sizes of those queues. A driver cannot initiate a transaction (e.g., assert the valid signal) unless it has credits available.

There are two types of credits used to manage traffic on TLN 250. The first, as mentioned above, are hop credits. These are credits used to manage the flow of transactions between adjacent points on the network. The other type of credits are referred to as end-to-end credits. To prevent persistent backpressure on the TLN 250, communication on the TLN 250 is controlled by end-to-end credits. The end-to-end credits create a contract between a transaction source and an endpoint to which it sends the transaction. An exception to this is a destination that processes inbound traffic immediately with no dependencies. In that case, the number of end-to-end credits can be considered infinite, and no explicit credits are required. The number of end-to-end credits is generally determined by the size of input queues in the destination units. Agents will generally have to perform both a hop credit check to the connected switch and an end-to-end credit check to the final destination. The transaction can only take place if a credit is available to both. Note that the TLN components (e.g., TLN switches) do not directly participate in or have any knowledge of end-to-end credits. These are agreements between the connected agents and not a function of the network itself.

As previously mentioned, the TLN 250 is a packet-switched mesh network using an array of TLN switches for communication between agents. Any routing strategy may be used on the TLN 250, depending on the implementation, but some implementations may arrange the various components of the TLN 250 in a grid and use a row, column addressing scheme for the various components. Such implementations may then route a packet first vertically to the designated row, and then horizontally to the designated destination. Other implementations may use other network topologies and/or routing strategies for the TLN 250.

E-Shims 257, 258 provide an interface between the TLN 250 and Ethernet Interfaces 277, 278 which connect to external communication links 237, 238 which may form part of communication links 130 as shown in FIG. 1. While two E-Shims 257, 258 with Ethernet interfaces 277, 278 and associated Ethernet links 237, 238 are shown, implementations can have any number of E-Shims and associated Ethernet interfaces and links. A M-Shim 259 provides an interface to a memory controller 279, which has a memory interface 239 and can connect to memory such as the memory 120 of FIG. 1. While only one M-Shim 259 is shown, implementations can have any number of M-Shims and associated memory controllers and memory interfaces. Different implementations may include memory controllers for varied types of memory, such as a DDR DRAM memory controller, a flash memory controller, a static memory controller, and/or a high-bandwidth memory (HBM) controller. The interfaces 257-259 include resources for routing data among nodes on the top-level network (TLN) 250 and external devices, such as high-capacity memory, host processors, other CGRA processors, FPGA devices and so on, that are connected to the interfaces 257-259 through external links 237-239.

As explained earlier, in the system shown in FIG. 1 each CGRP can include an array of configurable units that is disposed in a configurable interconnect (ALN), and the configuration file defines a dataflow graph including functions in the configurable units and links between the functions in the configurable interconnect. In this manner, the configurable units function as sources or sinks of data used by other configurable units providing functional nodes of the graph. Such systems can use external data processing resources not implemented using the configurable array and interconnect, including memory and a processor executing a runtime program, as sources or sinks of data used in the graph.

Furthermore, such systems may include communication resources which can be arranged in a mesh-like network known as a TLN 250. The communication resources may facilitate communication between the configurable interconnect of the ALN and the external data processing resources (memory and host). For example, the CGR arrays (e.g., CGR array 201, CGR array 202, etc.) in the CGRP 200 (which represents a configuration of CGRPs A-G) may be connected to the host 101 via the top-level network (TLN) 250 including links 260-269 shown in FIG. 2.

Figure 3:
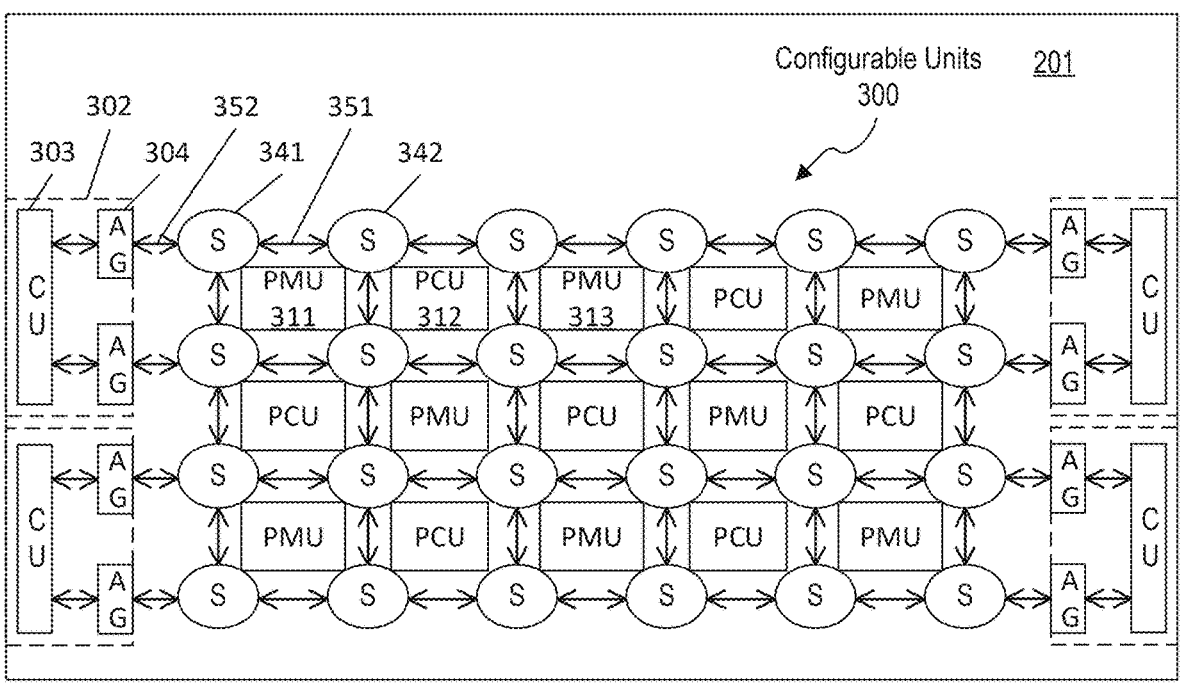
FIG. 3 is a simplified block diagram illustrating an example of a CGR array of an CGRP, according to some aspects.

FIG. 3 is a simplified block diagram illustrating an example of a CGR array 201 of an CGRP, according to some aspects. CGR array 201 may be identical to CGR array 202 of FIG. 2. The configurable units 300 in the array 201 are nodes on the array-level network. In this example, the configurable units 300 include a plurality of types of configurable units. The types of configurable units in this example include Pattern Compute Units (PCU) such as PCU 312, Pattern Memory Units (PMU) such as PMUs 311, 313, switch units(S) such as Switches 341, 342, and Address Generation and Coalescing Units (AGCU) such as AGCU 302. An AGCU can include one or more address generators (AG) such as AG 304 and a shared coalescing unit (CU) such as CU 303. Other implementations may include other types of configurable units such as other types of compute units, other types of memory units, and/or fused compute and memory units (FCMUs). For an example of the functions of these types of configurable units, see, Prabhakar et al., "Plasticine: A Reconfigurable Architecture for Parallel Patterns", ISCA '17, Jun. 24-28, 2017, Toronto, ON, Canada.

Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces. Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units by a configuration load/unload controller in an AGCU 302 based on the contents of the bit file to allow all the components to execute a program (i.e., a graph). Program Load may also load data into a PMU memory.

The array-level network includes links interconnecting configurable units 300 in the array 201. The links in the array-level network include one or more and, in this case three, kinds of physical buses: a chunk-level vector bus (e.g., 128 bits of data), a word-level scalar bus (e.g. 32 bits of data), and a multiple bit-level control bus. For instance, interconnect 351 between switches 341 and 342 includes a vector bus interconnect with vector bus width of 128 bits, a scalar bus interconnect with a scalar bus width of 32 bits, and a control bus interconnect. Other interconnects between adjacent switches, such as the interconnect 352 between two switches of the array, may have a similar structure.

The three kinds of physical buses differ in the granularity of data being transferred. In one example, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.)

used to reach the destination unit. The control network can be circuit switched based on timing circuits in the device, for example. The header is transmitted on a header bus to each configurable unit in the array of configurable units.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include (as non-limiting examples): a bit to indicate if the chunk is scratch-pad memory or configuration store data; bits that form a chunk number; bits that indicate a column identifier; bits that indicate a row identifier; and bits that indicate a component identifier.

The array-level network may route the data of the vector bus and/or scalar bus using two-dimension order routing using either a horizontal first or vertical first routing strategy. The vector bus and/or scalar bus may allow for other types of routing strategies, including using routing tables in switches to provide a more flexible routing strategy in some implementations.

During execution of a machine after configuration, data can be sent via one or more-unit switches and one or more links between the unit switches to the configurable units using the vector bus and vector interface(s) of the one or more switch units on the array-level network.

The configurable units can access off-chip memory through M-Shim 259 and memory controller 279 (see FIG. 2) by routing a request through an AGCU. An AGCU contains a reconfigurable scalar data path to generate requests for the off-chip memory. The AGCU contains FIFOs (first-in-first-out buffers for organizing data) to buffer outgoing commands, data, and incoming responses from the off-chip memory.

The address generators (AGs) in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

An AGCU has a set of virtual address generators (VAGs) that can be programmed to communicate with a particular configurable unit in the array 300, such as a PMU 311. Each VAG can also be programmed to generate a particular address pattern and includes several other features, which are described later in this disclosure. In at least one implementation, each AGCU includes 16 VAGs. In some implementations, the address generation units (e.g., AG 304) may each be a VAG.

As shown in FIG. 1, there are cases where a source CGRP may want to perform read or write direct memory access (DMA) operations to transfer data between a source memory coupled to the source CGRP and a destination memory coupled to a destination CGRP. An E-Shim lossless protocol provides a way to accomplish this communication. The E-Shim lossless protocol provides lossless network connectivity for dataflow applications over Ethernet in the event of data loss over a layer 2 (L2) network. The E-shim implements lossless connectivity on a per-stream basis, where a stream is a connection between a source CGRP E-Shim and a destination CGRP E-Shim. Each stream may carry Ethernet DMA (E-DMA) transactions, which are encapsulated in Ethernet frames. E-DMA traffic includes user space DMA operations to move data between a source CGRP memory and either a destination CGRP memory or a host memory.

There are other cases where a configurable unit on one CGRP may want to send or receive data controlled by another CGRP. A peer-to-peer (P2P) protocol provides several primitives that can be used to accomplish this, including a remote write, a remote read request, a remote read completion, a stream write, a stream clear-to-send (SCTS), and/or an RSync Barrier, which is a special primitive that is not encapsulated in a P2P header. The P2P primitives can be used to create more complex transactions that utilize one or more P2P primitive operations. The P2P complex transactions may include a remote store, a remote scatter write, a remote read, a remote gather read, a stream write to a remote PMU, a stream write to remote DRAM, a host write, a host read, and/or a barrier operation. Similar to E-DMA transactions, each stream may also carry P2P transactions, which are encapsulated in Ethernet frames. Ethernet P2P traffic includes P2P primitive operations and P2P complex transactions to move data between a configurable unit on a source CGRP and either a destination configurable unit on a destination CGRP or a destination CGRP memory coupled to the destination CGRP. The P2P protocol, primitives, and complex transactions are described in a related U.S. patent application Ser. No. 18/218,562, published as US 2024/0020261, titled "Peer-To-Peer Route Through In A Reconfigurable Computing System," and U.S. patent application Ser. No. 18/383,718, published as US 2024/0073129, titled "Peer-To-Peer communication between Reconfigurable Dataflow Units".

Figure 4A:
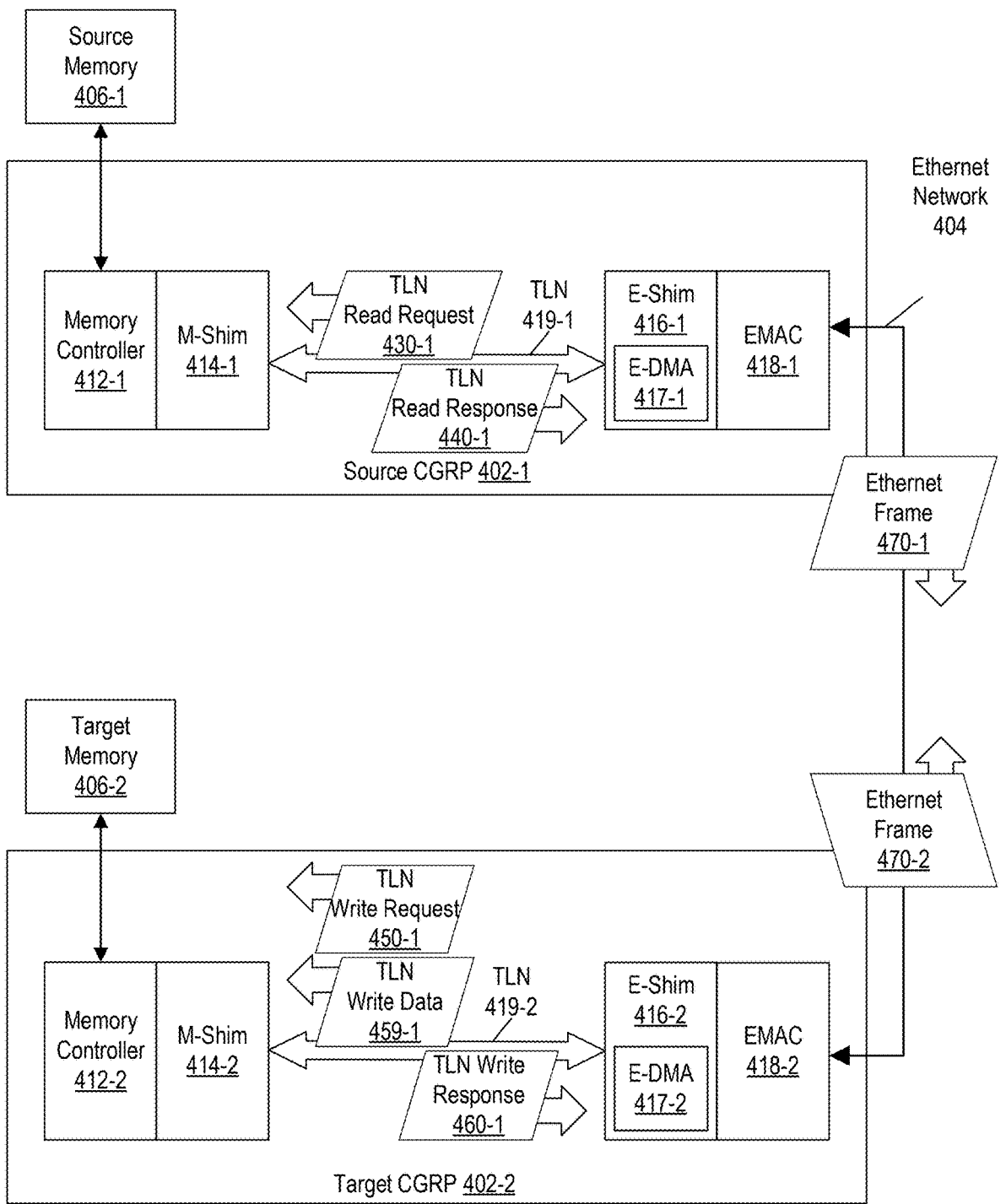
FIG. 4A illustrates an example of an Ethernet direct memory access (E-DMA) write operation using the E-Shim lossless protocol, according to some aspects.

FIG. 4A illustrates an example of an Ethernet direct memory access (E-DMA) write operation using the E-Shim lossless protocol, according to some aspects. An E-DMA write operation allows a source CGRP 402-1 to perform an E-DMA data transfer from a source memory 406-1 coupled to the source CGRP 402-1 to a target memory 406-2 coupled to a target CGRP 402-2 over an Ethernet network 404. The source and target memories, memory 406-1 and 406-2, can each be a memory, such as memory-A 121 and memory-B 122, respectively, previously described with reference to FIG. 1. Different implementations may use various types of memory, such as, but not limited to, DDR DRAM, and/or High Bandwidth Memory (HBM). The illustrated CGRP 402-1 includes a memory controller 412-1, an M-Shim 414-1, a TLN 419-1, an E-Shim 416-1 comprising an E-DMA engine 417-1, and an EMAC 418-1. Similarly, the illustrated CGRP 402-2 includes a memory controller 412-2, an M-Shim 414-2, a TLN 419-2, an E-Shim 416-2 comprising an E-DMA engine 417-2, and an EMAC 418-2. The illustrated CGRPs 402-1 and 402-2, memory controllers 412-1 and 412-2, M-Shims 414-1 and 414-2, E-Shims 416-1 and 416-2, EMACs 418-1 and 418-2, and the TLNs 419-1 and 419-2, may be structurally and functionally similar to the corresponding CGRP 200, memory controller 279, M-Shim 259, E-Shims 257 and 258, Ethernet I/Fs 277 and 278, and TLN 250 previously described with reference to FIG. 2.

As shown in FIG. 4A, during an example E-DMA write operation, the source E-Shim 416-1 sends a TLN read request 430-1 to the M-Shim 414-1 over the TLN 419-1 to retrieve data at a source address 433-1 from the source memory 406-1. The TLN 419-1 uses the M-Shim ID of the TLN read request 430-1 to identify a specific agent on the TLN 419-1 and provides the TLN read request 430-1 to the M-Shim 414-1 associated with the M-Shim ID. The M-Shim 414-1 receives the TLN read request 430-1 and provides the memory read operation information including the source data address 433-1 and the data length 435-1 to the memory controller 412-1 to initiate the E-DMA read operation. The memory controller 412-1 performs the E-DMA read operation to transfer the data from the source memory 406-1 to the M-Shim 414-1.

Figure 4C:
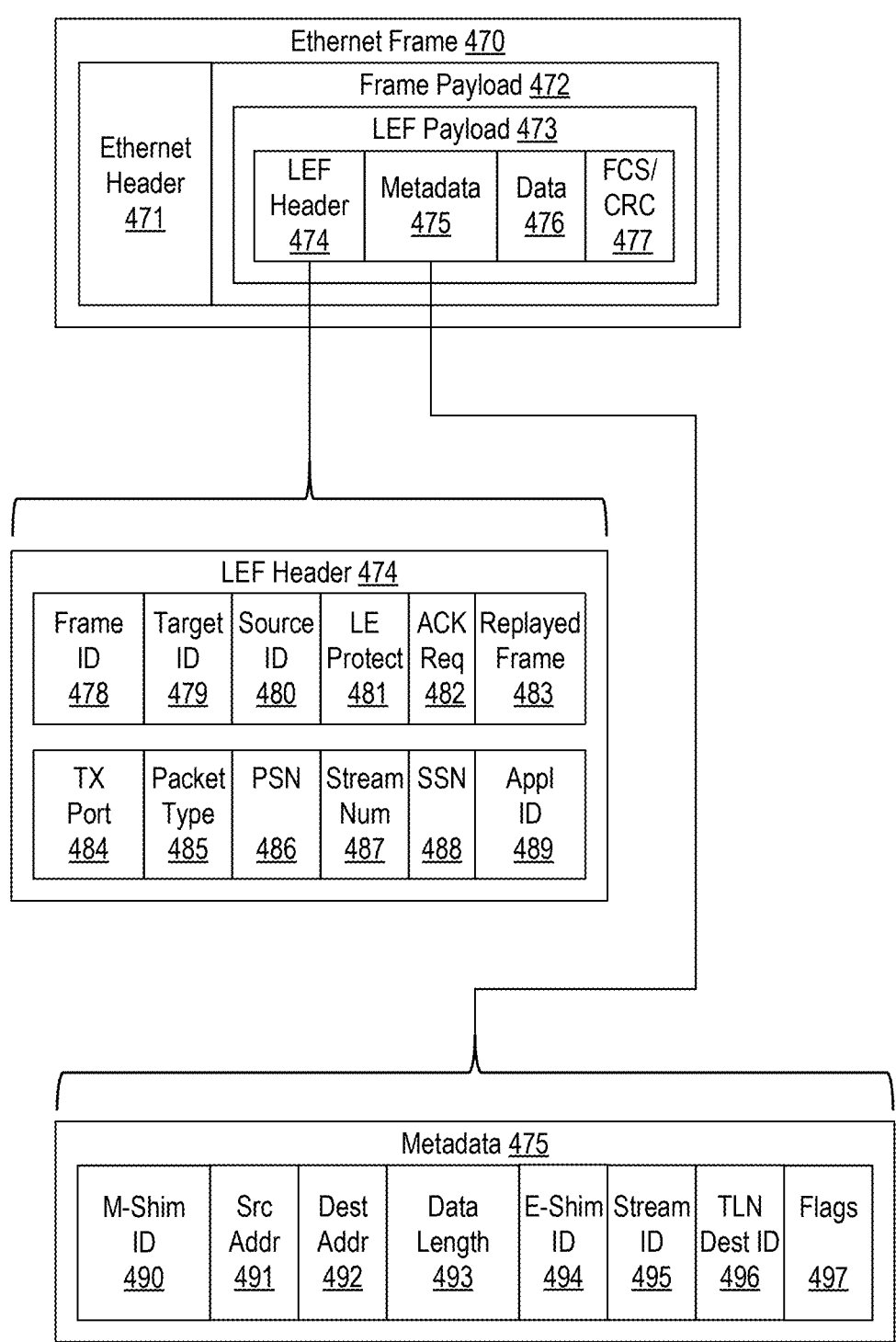
FIG. 4C illustrates an example of an Ethernet frame comprising an Ethernet header and a frame payload including a lossless Ethernet Framer (LEF) payload, according to some aspects.

Once the memory controller 412-1 completes the memory read operation, the M-Shim 414-1 sends, over the TLN 419-1, a TLN read response 440-1. The TLN read response 440-1 may include metadata 441-1 and the data transferred from the source memory 406-1 to the E-Shim ID 446-1 associated with the E-Shim 416-1 as data 476-1 as shown in FIG. 4C.

The E-Shim 416-1 receives the TLN read response 440-1. The E-Shim 416-1 generates an Ethernet frame 470-1 including an Ethernet header 471-1 and a frame payload 472-1. The E-Shim 416-1 encapsulates a LEF header 474-1 metadata 475-1 and the data 449-1 of the TLN read response 440-1 into corresponding portions of the Ethernet header 471-1 and the frame payload 472-1. The E-Shim 416-1 may transmit, using the EMAC 418-1, the Ethernet frame 470-1 over the Ethernet network 404 to the target CGRP 402-2.

The EMAC 418-2 of the target CGRP 402-2 may receive the Ethernet frame 470-1 based on the MAC address in the Ethernet Header 471-1 matching the MAC address of the EMAC 418-2. The EMAC 418-2 provides the Ethernet frame 470-1 to the E-Shim 416-2. The E-Shim 416-2 de-frames the Ethernet frame 470-1 and generates a TLN write request 450-1 and TLN write data 459-1 based on at least a portion of the metadata 475-1 and the data 476-1 encapsulated in the Ethernet frame 470-1. The E-Shim 416-2 sends the TLN write request 450-1 and TLN write data 459-1 to the M-Shim 414-2 over the TLN 419-2 to perform an memory write operation of the TLN write data 459-1 to the target memory 406-2. The TLN 419-2 uses the destination address 492-1 (or in some implementations, the TLN destination ID 496-1) encapsulated in the Ethernet frame 470-1 to identify a specific agent on the TLN 419-2 to perform the TLN write request 450-1, which is the M-Shim 414-2 in this example.

The M-Shim 414-2 receives the TLN write request 450-1 and provides memory write operation information including the destination address 492-1, the data length 493-1, and the TLN write data 459-1 to the memory controller 412-2 to initiate the memory write operation. The memory controller 412-2 performs the memory write operation to transfer the TLN write data 459-1 to the destination address 454-1 in the target memory 406-2. Once the memory controller 412-2 completes the memory write operation, the M-Shim 414-2 sends, over the TLN 419-2, a TLN write response 460-1 to the E-Shim 416-2 indicating that the memory write operation of the TLN write operation has been completed.

In some examples, the E-DMA operation may be a scatter/gather E-DMA operation and instead of providing one memory address and the data length of the data to be accessed, a pair of a memory addresses and corresponding data lengths at the memory addresses provided for each piece of data in the scatter/gather E-DMA operation.

In some examples, the E-Shim 416 may also implement a lossless Ethernet protocol that may provide lossless network connectivity for dataflow applications over the Ethernet network 404 when the E-Shim 416 detects Ethernet frame drops over a Layer 2 Ethernet network.

FIG. 4C illustrates an example of an Ethernet frame comprising an Ethernet header and a frame payload including a lossless Ethernet Framer (LEF) payload, according to some aspects. The Ethernet frame 470 includes an Ethernet header 471 and a frame payload 472 including a lossless Ethernet Framer (LEF) payload 473. The LEF payload 473 includes a LEF header 474, metadata 475, data 476, and a frame check sequence (FCS) including a cyclic redundancy check (CRC), FSC/CRC 477, which may be used to detect any in-transit corruption of data. The Ethernet frame 470 including the Ethernet header 471 and the frame payload 472 are illustrated according to an implementation. Other implementations may include somewhat different information in the Ethernet frame 470, the frame payload 472, the LEF payload 473, the LEF header 474, the metadata 475, the data 476, and the FCS/CRC 477 to implement a lossless protocol within the scope of this disclosure.

As illustrated in FIG. 4C, the LEF header 474 may comprise a frame ID 478, a target ID 479 to identify the destination CGRP 402 and E-Shim 416, a source ID 480 to identify the source CGRP 402 and E-Shim 416, a lossless Ethernet (LE) protected indicator 481, an acknowledgement (ACK) request indicator 482, a replayed frame indicator 483, a transfer (TX) port 484, a packet type 485, a packet sequence number (PSN) 486, a stream number 487, a stream sequence number (SSN) 488, and an application ID 489.

A specific predetermined value for the frame ID 478 indicates that the Ethernet frame 470 utilizes the lossless Ethernet protocol and includes the LEF header 474 described herein.

The LE protected indicator 481 may indicate that the specific Ethernet frame is within a stream that is protected by a lossless Ethernet protocol.

The ACK request indicator 482 may indicate that the current Ethernet frame 470 requires an ACK back from a target CGRP 402. When a source CGRP 402 sets the ACK request indicator 482 in the LEF header 474 to indicate that an ACK is requested, it directs the target CGRP 402 to reply with an ACK. Regardless of receiving the ACK request indicator 482, the target CGRP 402 may be configured to send periodic ACK frames to the source CGRP 402.

The replayed frame indicator 483 may indicate that the current Ethernet frame 470 is a re-transmission Ethernet frame in response to a dropped Ethernet frame. When the source CGRP 402 sets the replayed frame indicator 483 in the LEF header 474 to indicate that the current Ethernet frame 470 is a re-transmission Ethernet frame, it may indicate to the target CGRP 402 that the Ethernet frame 470 is a re-transmission Ethernet frame triggered by a previous NACK event.

The packet type 485 may identify the type of packet, such as, a start stream packet, a P2P packet, an EDMA packet, an ACK packet, or a negative acknowledgement (NACK) packet.

The PSN 486 may be sequentially incremented for each Ethernet frame 470 of a protected stream. The PSN 486 may have a value of zero for each Ethernet frame 470 of a non-protected stream. The source CGRP 402 may set the PSN 486 of every Ethernet frame 470 that is to be transmitted.

The stream number 487 may identify which of the active streams on the source CGRP 402 sent this Ethernet frame 470.

The SSN 488 may be associated with a stream and may remain constant throughout the lifetime of the associated stream. An SSN 488 for each stream may be initialized to a value of zero and may be sequentially incremented when the associated stream ends and is deallocated. The SSN 488 may be used to differentiate packets belonging to different PSN sequences which may be using the same stream related hardware. The PSN 486 may not be used for each Ethernet frame 470 of a non-protected stream.

The application ID 489 may identify the application associated with the Ethernet frame 470. The application identified by the application ID 489 may be a dataflow graph that may be configured onto at least the source CGRP 402-1 and the target CGRP 402-2, and is to be executed on these CGRPs 402.

As shown in FIG. 4C, metadata 475 of the LEF payload 473 of Ethernet frame 470 includes an address 491, 492 for the transaction, a transaction type (e.g., a read or a write), and a data length 493. Some implementations may include additional information in the metadata 475, such as a source address 491 of data in source buffer space in a source memory 406 coupled to a source CGRP 402-1 and a destination address 492 of data in destination buffer space in a destination memory 406 coupled to a destination CGRP 402-2, TLN identifiers 490, 496, E-Shim identifiers 494, a stream ID 495, flags 497 or any other metadata that may be helpful in an implementation. In at least one implementation, the flags 497 provide the transaction type information.

During operation in this example, the E-Shim 416-1 of the source CGRP 402-1 may add the LEF header 474 to each Ethernet frame 470 to be transmitted to the target CGRP 402-2. In addition, the E-DMA and P2P traffic may be saved in a replay buffer as a possible replay source in the event of dropped traffic. Each buffered E-DMA and P2P packet may be tracked using the stream number 487 and the PSN 486.

At the E-Shim 416-2 of the target CGRP 402-2, the PSN 486-1 of the received Ethernet frame 470-1 may be checked against the next expected PSN 486 for the stream designated by the stream number 487-1 to see if there is a match. If there is a match, traffic continues to propagate normally and a return Ethernet frame 470-2 with an ACK packet type 485-2 sent to the source CGRP 402-1 with the PSN 486-2 and stream number 487-2 of the successfully received incoming Ethernet frame 470-1. If there is a mismatch, the target CGRP 402-2 may send the response Ethernet frame 470-1 back to the source CGRP 402-1 with a NACK packet type 485-2 to indicate it is missing an Ethernet frame 470 in the sequence. The target CGRP 402-2 may also drop all incoming Ethernet frames 470 that don't match the next expected PSN 486.

Back at E-Shim 416-1 of the source CGRP 402-1, if the NACK is received, replay processing commences. Any new E-DMA packets from that stream are stalled. The PSN 486 and the stream number 487 delivered from the NACK frame are used to index into the replay buffer. The source CGRP 402-1 resends all traffic in the corresponding replay buffer from the PSN 486 from the NACK frame up to the current PSN 486 being processed in the transmit pipeline. Once all replay is completed, new E-DMA and P2P traffic can resume.

On the transmit side, the stream number 487 may be used to determine which buffer location the incoming TLN write request 450 and TLN read request 430 are copied into. On the receiving side, the stream number 487 along with the MAC address of the initiating E-Shim 416 on the source CGRP 402 may be used to determine checks against correct PSN 486 sequencing for that Stream.

FIG. 4B illustrates an example of an E-DMA read request and read completion operation using the E-Shim lossless protocol, according to some aspects. The E-DMA read request and read completion operations using the E-Shim lossless Ethernet protocol may together constitute a complex remote DMA read operation. An E-DMA read request and read completion operation allows a requester CGRP 402-1 to request a target CGRP 402-2 to perform an E-DMA read data transfer from a target memory 406-2 of the target CGRP 402-2 to a requester memory 406-1 of the requester CGRP 402-1 over an Ethernet network 404. The E-DMA read request and read completion operation functions similarly to the E-DMA write request operation previously described with reference to FIG. 4A.

During an E-DMA read request and read completion operation, the E-Shim 416-1 of the requester CGRP 402-1 generates an Ethernet frame 470-3 to perform a remote E-DMA read operation to retrieve data in the target memory 406-2 coupled to the target CGRP 402-2. The Ethernet frame 470-3 may comprise an Ethernet header 471-3 and a frame payload 472-3. The E-Shim 416-1 encapsulates at least a source address of data in the target memory 406-2 coupled to the target CGRP 402-2, a destination address of data in the requester memory 406-1 coupled to the requester CGRP 402-2, a data length of the data, and flags associated with the E-DMA read operation into corresponding portions of the Ethernet header 471-3 and the frame payload 472-3. The E-Shim 416-1 transmits, using the EMAC 418-1, the Ethernet frame 470-3 over the Ethernet network 404 to the target CGRP 402-2.

The EMAC 418-2 of the target CGRP 402-2 receives the Ethernet frame 470-3 based on the MAC address in the Ethernet Header 471-3 matching the MAC address of the EMAC 418-2. The EMAC 418-2 provides the Ethernet frame 470-3 to the E-Shim 416-2.

The E-Shim 416-2 de-frames the Ethernet frame 470-3 and generates a TLN read request 430-2 based on at least portions of the Ethernet header 471-3 and the frame payload 472-3. The E-Shim 416-2 sends the generated TLN read request 430-2 to the M-Shim 414-2 over the TLN 419-2 to retrieve data from the target memory 406-2 at the source address 434-2.

The M-Shim 414-2 receives the TLN read request 430-2 and provides the E-DMA read operation information, including the source address 463-2, and the data length 465-2, to the memory controller 412-2 to initiate the memory read operation. The memory controller 412-2 performs the memory read operation to transfer the data from the target memory 406-2 to the M-Shim 414-2 associated with the M-Shim ID 432-2. Once the memory controller 412-2 completes the memory read operation, the M-Shim 414-2 sends, over the TLN 419-2, a TLN read response 440-2, including the data transferred from the target memory 406-2, to the E-Shim 416-2.

The E-Shim 416-2 receives the TLN read response 440-2, and generates an Ethernet frame 470-4, including an Ethernet header 471-4, and a frame payload 472-4 including a LEF payload 473-4, a LEF header 474-4, metadata 475-4, data 476-4, and an FSC/CRC 477-4. The E-Shim 416-2 encapsulates the LEF header 474-4, the metadata 475-4, the data 476-4, and the FCS/CRC 477-4 into the LEF payload 473-4 of the Ethernet frame 470-4. The E-Shim 416-2 transmits, using the EMAC 418-2, the Ethernet frame 470-4 over the Ethernet network 404 to the requester CGRP 402-1.

The EMAC 418-1 of the requester CGRP 402-1 receives the Ethernet frame 470-4 and provides the Ethernet frame 470-4 to the E-Shim 416-1. The E-Shim 416-1 de-frames the Ethernet frame 470-4 and generates a TLN write request 450-2 and TLN write data 476-4 of the Ethernet frame 470-4. The E-Shim 416-1 sends the TLN write request 450-2 and TLN write data 459-2 to the M-Shim 414-1 over the TLN 419-1 to perform a memory write operation of the TLN write data 459 at the destination address 454-2 in the requester memory 406-1.

The M-Shim 414-1 provides memory write operation information, including destination address 454-2 in the requester memory 406-1 where the TLN write data 459-2 is to be written into, the data length 455-2 of the TLN write data 459-2, and the TLN write data 459-2 to the memory controller 412-1 coupled to the M-Shim 414-1 to initiate the memory write operation. The memory controller 412-1 performs the memory write operation to transfer the data from TLN write data 459-2 to the destination address 454-2 in the requester memory 406-1. Once the memory controller 412-1 completes the memory write operation, the M-Shim 414-1 sends, over the TLN 419-1, a TLN write response indicating that the TLN write request 450-2 has been completed.

Figure 5:
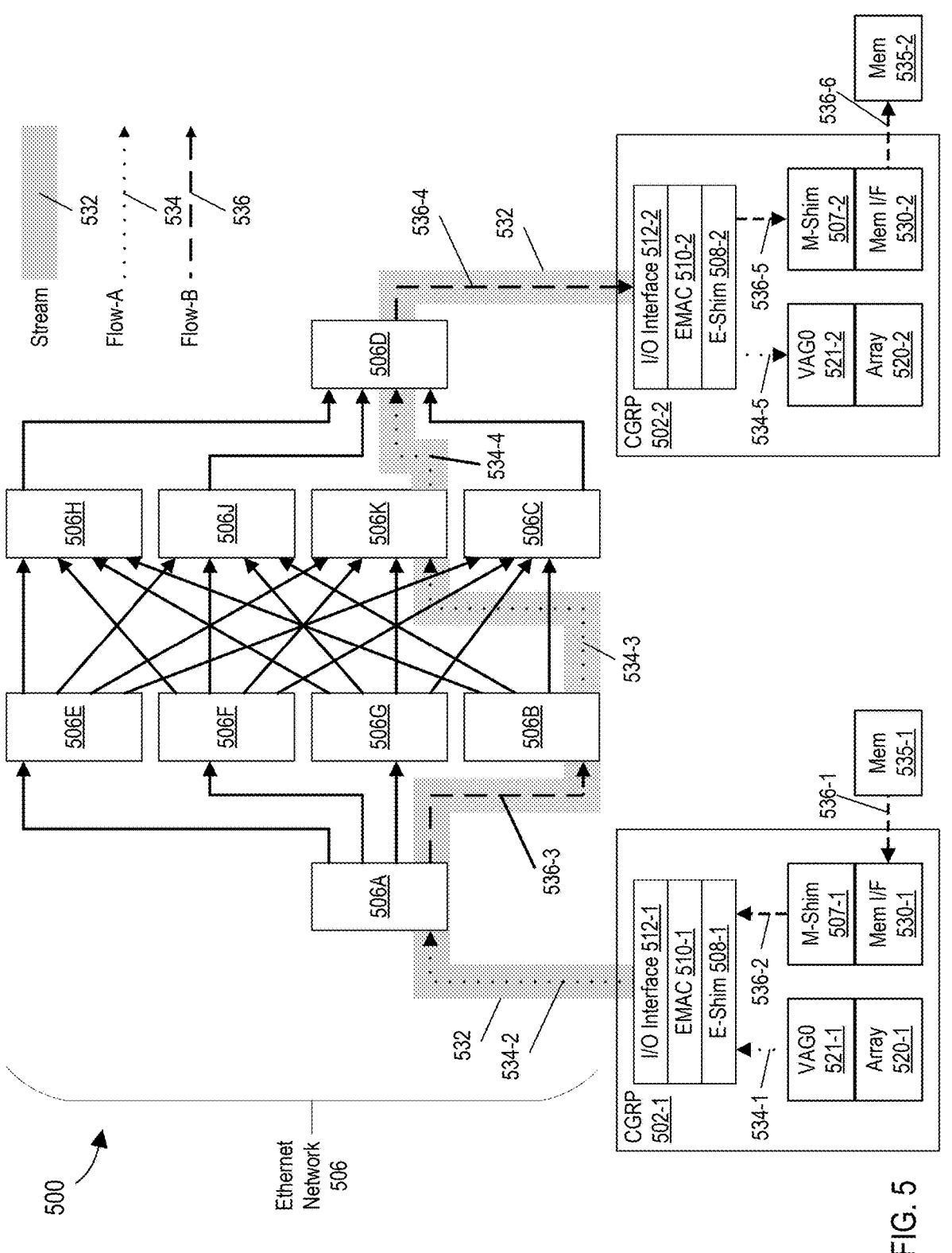
FIG. 5 is a block diagram illustrating an example of a CGRA system including a communication stream having flows from one CGRP to another CGRP over an Ethernet network, according to some aspects.

FIG. 5 is a block diagram illustrating an example of a CGRA system 500 including a communication stream having flows from one CGRP to another CGRP over an Ethernet network, according to some aspects. The illustrated CGRA system 500 includes CGRPs 502-1 and 502-2, and an Ethernet network 506. The illustrated CGRP 502-1 includes E-Shim 508-1, EMAC 510-1, I/O interface 512-1, VAGs including VAG0 521-1, array 520-1, M-Shim 507-1, and memory interface 530-1 coupled to memory 535-1. Similarly, CGRP 502-2 includes E-Shim 508-2, EMAC 510-2, I/O interface 512-2 VAGs including VAG0 521-2, array 520-2, M-Shim 507-2, and memory interface 530-2 coupled to memory 535-2.

A flow, as the term is used herein, is a set of transactions between one particular source in the source CGRP 502-1 to another particular target on the target CGRP 502-2. A stream, as the term is used herein, includes one or more flows having a common source CGRP 502-1 and target CGRP 502-2. In some implementations, all flows within a stream share the same source E-Shim and destination E-Shim and use the same Ethernet Traffic Class. In the illustrated CGRA system 500, flow 534 including flow portions 534-1 to 534-5 are unidirectional, P2P transactions, generated from one endpoint in CGRP 502-1 to another endpoint in CGRP 502-2. Flow 536 including flow portions 536-1 to 536-6 are unidirectional, E-DMA transactions, generated from one endpoint in CGRP 502-1 to another endpoint in CGRP 502-2.

The order of the transactions within both flows 534 and 536 are preserved and are delivered in order. In the example shown, flow 534 includes P2P transactions including a sequence of streaming writes (SWRITEs) from VAG0 521-1 of CGRP 502-1 to VAG0 521-2 of CGRP 502-2. Flow 536 includes E-DMA transactions comprising a sequence of E-DMA write operations from memory 535-1 of CGRP 502-1 to memory 535-2 of CGRP 502-2. As another example, flow 536 may include E-DMA transactions comprising a sequence of corresponding E-DMA read requests from CGRP 502-1 to CGRP 502-2, and read completion operations from memory 535-2 of CGRP 502-2 to memory 535-1 of CGRP 502-1. The first flow 534 and the second flow 536 are different flows, not the same flow, within the same stream 532.

As shown, a stream 532 may be an aggregation and encapsulation of flows from I/O interface 512-1 of CGRP 502-1, to another I/O interface 512-2 of CGRP 502-2. The stream 532 may encapsulate several elements including a source CGRP, a source MAC address, a target CGRP ID, a target MAC address, stream specific buffers, and hardware elements on the transmitting and receiving CGRPs 502-1 and 502-2, respectively. The order of transactions within stream 532 is preserved. However, there is no ordering of transactions maintained between different streams.

Example stream 532 may include multiple flows including flows 534 and 536 although in some cases a stream may include only a single flow. The transactions within stream 532 need to be delivered from the source CGRP 502-1 over Ethernet network 506 to the target CGRP 502-2 in order. This means that the Ethernet network 506 needs to preserve the order of the transactions within stream 532. This can be accomplished by using separate Ethernet links between each pair of I/O interfaces 512-1 and 512-2 of CGRPs 502-1 and 502-2 or by using switches and/or routers in the network 506 that are configured to route Ethernet frames in the same way as long as they have identical Ethernet headers. For example, the Ethernet network 506 may include a plurality of switches, such as switches 506A, 506B, 506C, 506D, 506E, 506F, 506G, 506H, 506J, and 506K, that route the Ethernet frames of a stream 532 between the source CGRP 502-1 and the target CGRP 502-2. Further, this means that the engine implementing stream 532 and its mechanisms needs to satisfy various network requirements so that the Ethernet network 506 preserves the order of the transactions.

A stream, such as stream 532, may exist between two CGRPs, such as CGRPs 502-1 and 502-2. However, stream 532 may not exist within a CGRP, such as the two CGRPs 502-1 and 502-2. A flow, for example, flows 534 or 536, may exist between the two CGRPs 502-1 and 502-2 and within both CGRPs 502-1 and 502-2.

A route-through transaction may start at a source CGRP, such as 502-1, and may pass through one or more route-through CGRPs (not shown) before arriving at a target CGRP, such as CGRP 502-2. As such, a route-through CGRP must not re-order transactions within a flow. Furthermore, a route-through transaction may pass through multiple streams even though it is within a single flow.

Figure 6:
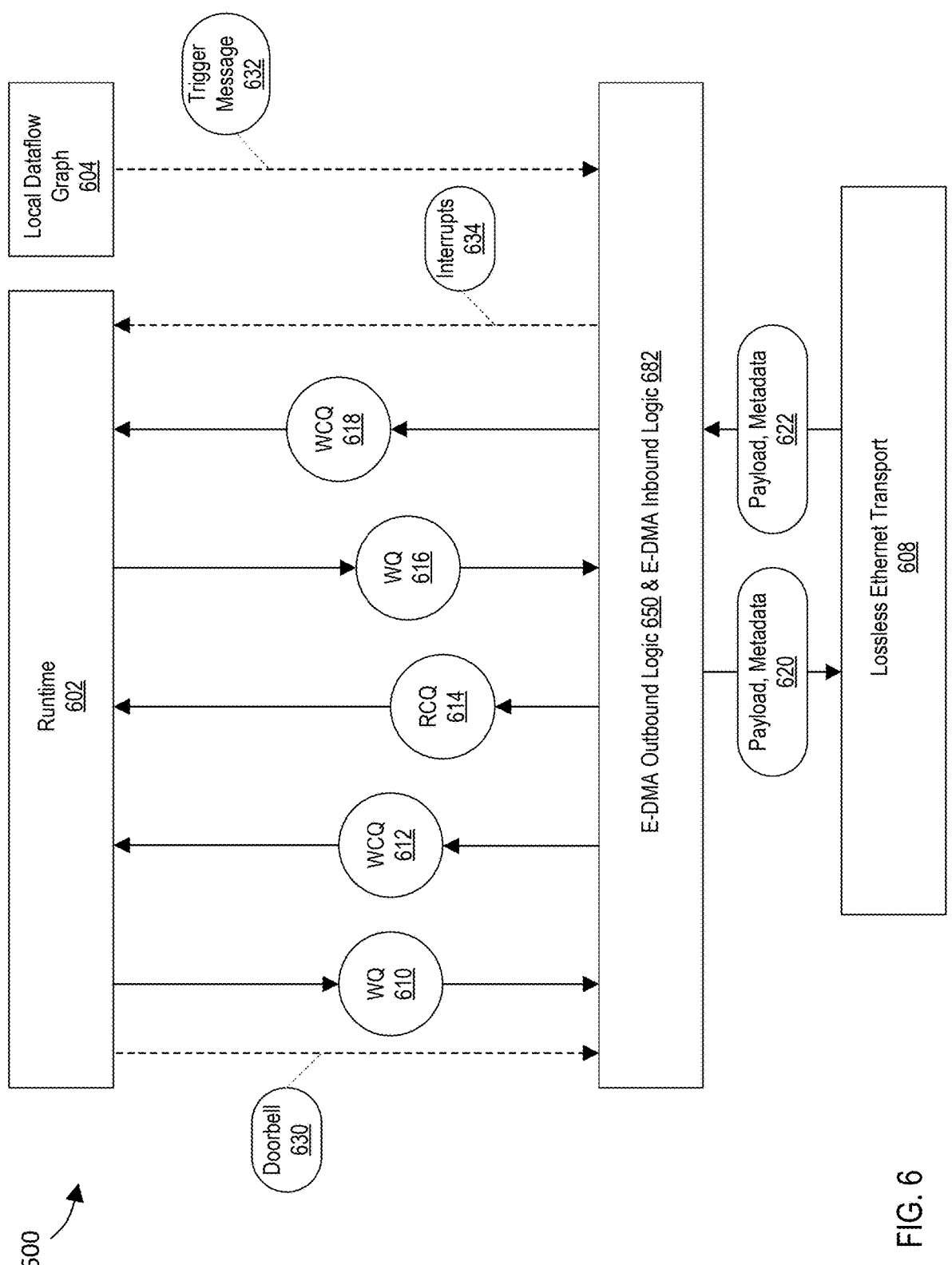
FIG. 6 is a block diagram illustrating an example of a CGRA system that may implement Ethernet direct memory access (E-DMA) data transfers, in operation with descriptors in work queues, between one or more CGRPs and host memory, according to some aspects.

FIG. 6 is a block diagram illustrating an example of a CGRA system 600 that may implement Ethernet direct memory access (E-DMA) data transfers, in operation with descriptors in work queues, between one or more CGRPs and host memory, according to some aspects. The illustrated CGRA system 600 includes a runtime 602, a local dataflow graph 604, E-DMA outbound logic 650, E-DMA inbound logic 682, and a LET 608. The illustrated runtime 602 may include runtime processes, software, and computer programs, which host 101 (not shown in FIG. 6), previously described with reference to FIG. 1, may be used to run. Data exchanged between the E-DMA outbound logic 650 and the E-DMA inboud logic 682 and the lossless Ethernet transport 608 may include payload and metadata 620 and payload and metadata 622.

The LET 608 may use a lossless Ethernet transport protocol to transfer data over the Ethernet network between a CGRP and another CGRP or between a CGRP and a host memory. The LET 608 may use a new application programming interface (NAPI) like model for an extension to an Ethernet device driver frame processing framework for transferring data over the Ethernet network, which may improve the performance of high-speed networking.

The runtime 602 software may configure work queues, such as WQs 610 and 616, each with work queue entries (WQEs). Each WQ may be associated with a particular Ethernet channel, and each WQE may be associated with a particular stream. Each WQE may encapsulate information that the E-DMA outbound logic 650 and the E-DMA inbound logic 682 may use to perform a single transfer between two CGRPs, such as CGRPs 502-1 and CGRP

502-2 previously described with reference to FIG. 5. The information in a WQE may point to contiguous read and write data buffers in a CGRP, in a memory in the host 101, or in an external memory that is accessible by the host 101 and the CGRP. In some cases, the data to be transferred may be embedded in a WQE that may be used for control and other short messages.

Each WQ has an associated location pointer and head and tail offsets that the E-DMA outbound logic 650 and the E-DMA inbound logic 682 may use to process a particular WQE such as the head WQE in the WQ, or perform other actions. The E-DMA outbound logic 650 and the E-DMA inbound logic 682 may maintain each WQ including the head and tail offsets for the current WQEs. Any WQ can be designated as an E-NIC WQ, where each WQE of the E-NIC WQ may point to a single L3/L4 packet created by a software driver. The E-DMA outbound logic 650 and the E-DMA inbound logic 682 may bypass the lossless Ethernet protocol to transmit these packets.

The information in each WQE may also include a local target, for example, a VAG or a LET 608, which may be sent a completion notification or a trigger, respectively, as programmed and configured by runtime 602. The information may further include a WQ pause processing indicator and an ignore ACK requirements indicator.

The E-DMA outbound logic 650 may read a current WQE from a WQ and may convert the WQE into a series of transfer queue entries (TQEs), each may correspond to a single packet for transfer.

Each WQ may be triggered to start operation. The E-DMA outbound logic 650 may process WQEs in a WQ until the WQ runs to completion, the E-DMA outbound logic 650 may encounter a WQE that indicates the WQ is to be paused, or that the WQ is suspended. In either case, the WQ is suspended. A WQ may be woken up from a suspended state and may continue to process WQEs by a doorbell write, such as a doorbell write 630 from runtime 602, a trigger from a local dataflow graph 604 that may be running on a CGRP, or a message (e.g., a trigger message). A trigger message may be received via a TLN. In an example, the trigger message can be received via the TLN from a CGR array of a CGRP that may be executing the local dataflow graph 604. In a similar manner, transfers may also be triggered by doorbell writes 630 and message triggers from a CGR array of a CGRP. Completion notifications to runtime 602 may be sent through work completion queues (WCQs), and completion notifications may be sent to a CGR array of CGRP with messages.

Messages, for example I/O device messages, may be used to communicate between the E-DMA outbound logic 650 and the LET 608, and AGCUs, such as AGCU 302, as previously described with reference to FIG. 3C, on the request network of a TLN of a CGRP. The E-DMA outbound logic 650 may use messages to receive triggers from an AGCU or another E-DMA outbound logic 650 to wake up a suspended WQ, which may be equivalent to a doorbell write to wake up a suspended WQ. The E-DMA outbound logic 650 may also use a message to notify a VAG of an AGCU or another E-DMA outbound logic 650 that an E-DMA transfer has completed. These notifications may be initiated by an E-DMA outbound logic 650 or received by this E-DMA outbound logic 650 when the notification is a remote notification from another E-DMA outbound logic 650. An address in the request may be used to encode properties of the message, such as an I/O device message. The message may include an address, which may contain a physical WQ ID. Messages used to communicate completion notifications may trigger WQs when they are sent to a recipient E-DMA outbound logic 650, where the recipient E-DMA outbound logic 650 may include itself.

The runtime 602 software may configure work completion queues (WCQs), such as WCQ 612 and WCQ 618, to contain work completion queue entries (WCQEs). A WCQE may be used to communicate the completion of an E-DMA transfer specified by a WQE and performance measurement information for the E-DMA transfer. Each WCQE may include a completion status and a WQE identifier (ID) that identifies the WQE associated with the completion status, which may be provided to runtime 602. Runtime 602 may use the completion status to determine whether the E-DMA transfer completed successfully or had an error.

The runtime 602 software may configure response completion queues (RCQs), such as RCQ 614, to contain response completion queue entries (RCQEs). A RCQE may be used to communicate the completion of a request on the request network of a TLN of a CGRP.

The E-DMA inbound logic 682 may send an interrupt, such as an interrupt 634, to runtime 602 that may indicate dropped ACK packets, dropped frames, and a lost link connection, a number of request NACK packets sent by a receiver exceeds a threshold, and other similar events.

FIGS. 7A, 7B, 7C, and 7D are block diagrams illustrating an example CGRA system 700 configured to implement looping dynamic memory access (DMA) operations, according to an implementation of the present disclosure. As will become clear in the following detailed description, the memory-to-memory DMA functionality using message-based triggers may be runtime configured by the host 101 but dataflow is orchestrated by the CGRA system 700 without runtime environment or host 101 involvement.

FIG. 7A is a simplified block diagram illustrating an example of a CGRA system 700 configured to implement looping dynamic memory access (DMA) operations, according to some aspects. As illustrated, CGRA system 700 includes, but is not limited to, CGRPs 702-1 and 702-2, and an Ethernet network 706. The illustrated CGRP 702-1 comprises an E-Shim 708, an Ethernet media access controller (EMAC) 710, an I/O interface 712, a TLN 718, an M-Shim 714, a memory controller 713 coupled to external memory 715, and a CGR array 717 including configurable units 716 and an AGCU 719. The I/O interface 712 implements the physical layer of the Ethernet protocol. The illustrated E-Shim 708 includes an E-DMA engine 790, a LEF outbound engine 730, a LEF inbound engine 760, and a P2P engine 789. The TLN 718, the M-Shim 714, the memory controller 713, and the CGR array 717 including the configurable units 716 and the AGCU 719 may be structurally and functionally similar to the TLN 250, the M-Shim 259, the memory controller 279, and the CGR array 201 including the configurable units 300 and an AGCU 210, such as AGCU 211 to AGCU 214, previously described with reference to FIGS. 2 and 3.

The illustrated E-Shim 708 may perform various functions, including acting as an interface between the Ethernet network 706 and the TLN 718 for P2P transactions, and serving as an E-DMA engine 790 to transfer data between local memory, such as memory 715, and remote memory, such as host memory or memory attached to a remote CGRP, such as CGRP 702-2. Communication between one or more CGRPs using P2P protocol is described in related U.S. patent application Ser. No. 18/383,718, published as US 2024/0073129, titled "Peer-To-Peer communication between Reconfigurable Dataflow Units". In that application a P-Shim is described which acts as an interface between the TLN and a Peripheral Component Interconnect Express (PCIe) channel. The LEF Outbound Engine 730 and the LEF Inbound Engine 760 in E-Shim 708 may include much of the same functionality to enable P2P transactions to flow between CGRPs except that the transactions are encapsulated in Ethernet frames instead of PCIe transaction level packets.

The illustrated E-Shim 708 may use the I/O interface 712 to transmit and receive Ethernet frames between multiple CGRPs, including CGRPs 702-1 and 702-2, over an Ethernet network 706. An Ethernet frame is a data link layer protocol data unit and uses the underlying physical layer transport mechanisms. To do this, the E-Shim 708 may support different types of Ethernet frames including, but not limited to, layer 2 (L2) frames, user datagram protocol (UDP) frames, internet protocol (IP)/UDP frames, virtual Extensible LAN (VxLAN) frames, multiprotocol label switching (MPLS) frames, and other types of Ethernet frames.

FIG. 7B is a block diagram showing more detail of the ethernet media access controller (EMAC) 710 illustrated in FIG. 7A, according to some aspects. The EMAC 710 may pass Ethernet frames between an Ethernet network and a user application, such as a dataflow graph configured onto at least CGRPs 702-1 and 702-2, through the I/O interface 712 and the E-Shim 708. Asynchronous FIFOs, including outbound FIFOs 722 and inbound FIFOs 724, of the EMAC 710 may interface with the E-Shim 708. The illustrated I/O interface 712 (i.e. Ethernet physical layer interface, or Phy) may provide Ethernet connectivity to CGRP 702-1. As shown in FIG. 7B, the EMAC 710 may include Ethernet MAC logic 726 and pause/PFC logic 728.

In some implementations, the EMAC 710 may provide multiple Ethernet channels. Thus, the E-Shim 708 may also interface with one or more EMAC channels when operating in different modes. For example, in some implementations, the E-Shim 708 may interface with one EMAC channel of the EMAC 710 when operating in 800G mode and two EMAC channels of the EMAC 710 when operating in 2×400G mode. In other implementations, depending on the characteristics of the EMAC 710, the E-Shim 708 may interface with any number of EMAC channels when operating in one or more different modes of operation.

FIG. 7C is a block diagram showing more detail of the E-DMA engine 790 illustrated in FIG. 7A, according to some aspects. The illustrated E-DMA engine 790 includes an E-DMA queue interface (QIF) 792, one or more work queues (WQs) 791 that can each hold one or more work queue entries (WQEs) comprising WQE1 793-1, WQE2 793-2, and WQE 793-3, one or more work completion queues (WCQs) 795 that can each hold one or more work completion queue entries (WCQEs) including WCQE1 797-1, WCQE2 797-2, and WCQE 797-3, and a stream table 798. Other implementations may have different organizations of circuitry within the E-Shim 708.

Figure 7D:
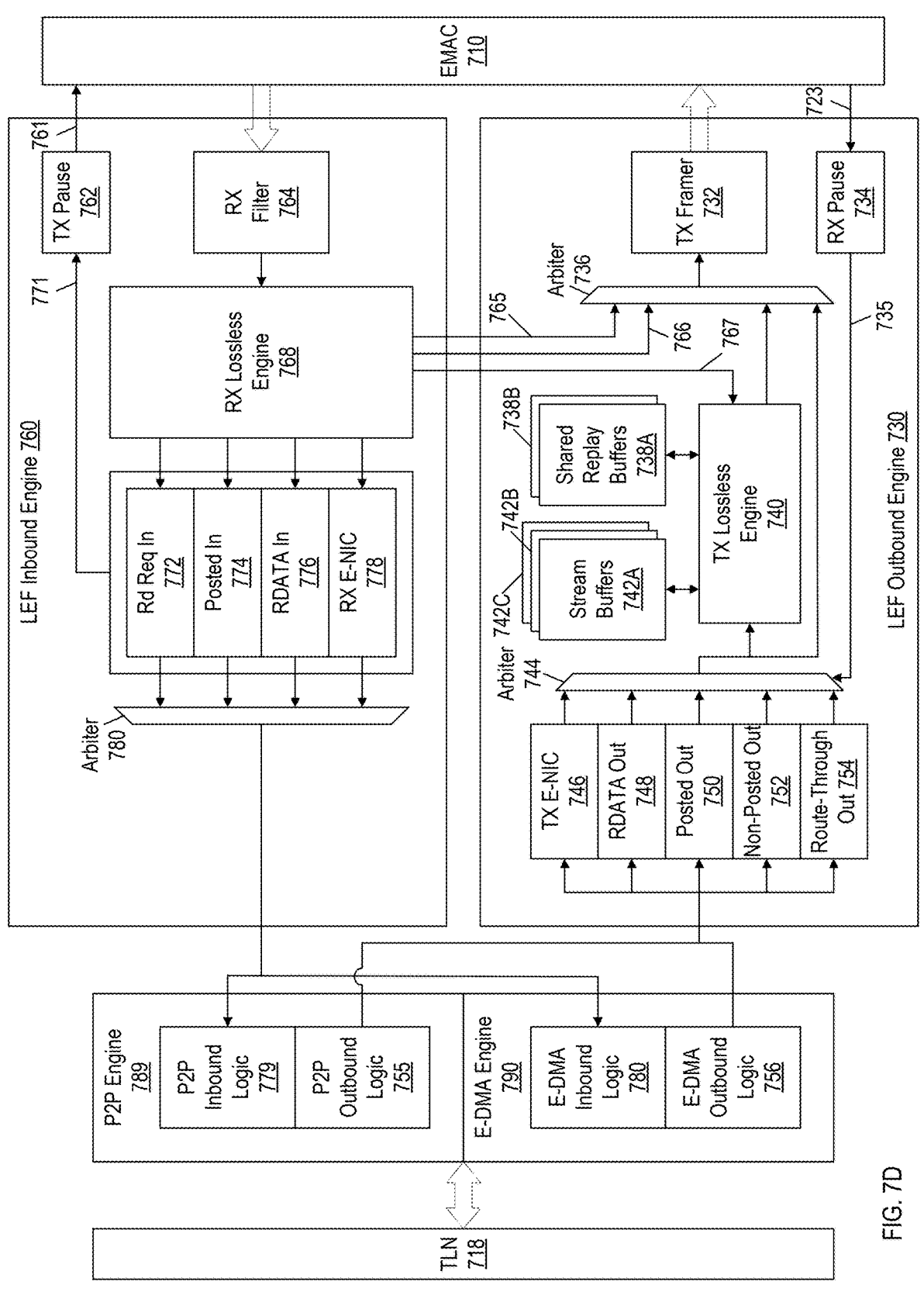
FIG. 7D is a block diagram showing more detail of the LEF outbound engine, the LEF inbound engine, the P2P engine, and the E-DMA engine of the CGRA system illustrated in FIG. 7A, according to some aspects.

FIG. 7D is a block diagram showing more detail of the LEF outbound engine 730, the LEF inbound engine 760, the P2P engine 789, and the E-DMA engine 790 of the CGRA system 700 illustrated in FIG. 7A, according to some aspects. The illustrated LEF outbound engine 730 includes a TX framer 732, an RX pause circuit 734, an arbiter 736, shared replay buffers 738, stream buffers 742, TX lossless engine 740, an arbiter 744, and outbound buffers 746-754. The illustrated E-DMA engine 790 includes E-DMA inbound logic 780 and E-DMA outbound logic 756. The illustrated P2P engine 789 includes P2P inbound logic 779 and P2P outbound logic 755. In some implementations, the shared replay buffer 738 may be divided into multiple buffers, such as a first shared replay buffer 738A to hold header information, such as an Ethernet header 471, the LEF header 474, and/or the metadata 475, of transmitted Ethernet frames 470, and a second shared reply buffer 738B to hold the data 476 of the transmitted Ethernet frames 470. Some implementations may include multiple stream buffers, such as a first stream buffer 742A for a first stream, a second stream buffer 742B used for a second stream, and a third stream buffer 742C for a third stream. Any number of stream buffers 742 may be included to support an equivalent number of streams, depending on the implementation. The P2P engine 789 acts as an interface for P2P transactions received over the TLN 718 and includes circuitry to properly interpret and handle such transactions. The E-DMA engine 790 acts as an interface for the TLN 718 for E-DMA transactions initiated by the E-DMA engine 790.

The TX Ethernet network interface controller (E-NIC) buffer 746 holds E-NIC frames to transmit. The read data (RDATA) outbound buffer 748 holds data returned in response to both P2P and E-DMA read requests, received from another CGRP, to local memory of CGRP 702-1, such as memory 715. The outbound non-posted request buffer 752 holds both P2P and E-DMA read requests for remote memory. The remote memory may be associated with a host or a remote CGRP, such as CGRP 702-2. Route-through outbound buffer 754 holds P2P transactions that were received from one remote device (host or CGRP) by CGRP 702-1 and are to be sent to a different remote device through the Ethernet network. Outbound posted request buffer 750 holds all other requests, both P2P and E-DMA requests targeting a host or a remote CGRP, such as CGRP 702-2. Non-limiting examples of requests that are put into the outbound posted request buffer 750 include a P2P streaming write from a configurable unit 716 in CGR Array 717 of CGRP 702-1 to a configurable unit in a CGR Array of CGRP 702-2, and an E-DMA write operation moving data from local memory 715 to a memory coupled to CGRP 702-2.

The arbiter 744 selects a next transaction to send, which may be based on a round-robin algorithm, from one of the outbound buffers 746-754, and sends it to the TX lossless engine 740. The TX lossless engine 740 adds a LEF header 474, stores the transaction to the replay buffer 738, and presents it to the arbiter 736 to be passed to the TX framer 732. In some cases, such as for TX E-NIC transactions, the TX lossless engine 740 may be bypassed, and presented directly to the arbiter 736 to be passed to the TX framer 732. The arbiter 736 may use any arbitration algorithm, including but not limited to a round-robin arbitration, to select among possible packets, including ACK packets 765 and NACK packets 766, to send to the TX framer 732. The TX framer 732 encapsulates the LEF payload 473 including the LEF header 474, metadata 475, data 476, and FCS/CRC 477, into an Ethernet frame 470. The TX framer 732 also uses information from the stream table 798 to generate an Ethernet header 471 and puts the Ethernet frame 470 into the FIFOs 722 so that the EMAC 710 can send it through the I/O interface 712 over the Ethernet network 706. Information about the Ethernet frames 470 may be stored in a stream buffer 742 associated with its stream. As an example, an Ethernet frame 470 is a part of stream 0, information about the stream, which may include pointers into the shared replay buffers for the frame header information and data, is stored in the stream buffer for stream 0, such as the first stream buffer 742A.

The illustrated LEF inbound engine 760 includes a TX pause circuit 762, an RX filter 764, an RX lossless engine

768, inbound buffers 772-778, and an arbiter 780. The read request inbound buffer 772 holds non-posted requests, such as P2P read requests and E-DMA read requests received over the Ethernet network 706. Posted inbound buffer 774 holds other requests, such as P2P streaming writes from a configurable unit in a remote CGRA or E-DMA writes from a remote CGRA. The read data inbound buffer 776 holds read data returned in response to P2P or E-DMA read requests sent to a remote device over the Ethernet network 706. RX E-NIC inbound buffer 778 holds received E-NIC frames.

The LEF Inbound Engine 760 of E-Shim 708 may further receive incoming Ethernet frames 470 from the EMAC 710, extract TLN write requests 450 and/or TLN read requests 430, and store them into the appropriate inbound buffer 772-778, based on the metadata 451. The LEF Inbound Engine 760 may then retrieve the TLN write requests 450 and/or the TLN read requests 430 from the inbound buffers 772-778 and present them to the arbiter 780. The arbiter 780 may use any arbitration algorithm, including but not limited to a round-robin arbitration, to select among possible TLN write requests 450 and TLN read requests 430 to send to the P2P inbound logic 779 of the P2P engine 789 or the E-DMA inbound logic 780 based on the packet type 485 of the Ethernet packet 470. The E-DMA inbound logic 780 may transmit the TLN write requests 450 or TLN read requests 430 to a destination, such as an M-Shim 714 associated with the M-Shim ID 452 of the TLN write requests 450 or the M-Shim ID 432 of the TLN read request 430, over the TLN 718. The E-Shim 708 may also transmit and receive TX E-NIC and RX E-NIC packets.

In examples, the E-Shim 708 may also implement a lossless protocol that may provide lossless network connectivity for dataflow applications over an Ethernet network 706 when the E-Shim 708 detects Ethernet frame drops over the Layer 2 Ethernet network. The lossless protocol may be implemented using the TX lossless engine 740-1 for outbound packets in conjunction and the RX lossless engine 768-1 for inbound Ethernet frames 470. At a high level, the lossless protocol works by the LEF outbound engine 730-1 in the source CGRP 702-1 incrementing an SSN 488 in the LEF header 474 in the LEF payload 473 in each Ethernet frame 470 carrying an E-DMA read request, an E-DMA write request, a P2P read request, or a P2P streaming write for a given stream.

The RX lossless engine 768 in the target CGRP checks the SSN 488 in the LEF payload 473 of each incoming Ethernet frame 470 to ensure that the incoming LEF payloads 473 for a stream are received in order. An ACK message is sent periodically over the Ethernet network 706 from the target CGRP 702-2 to the source CGRP 702-1 with the SSN 488 in the last LEF payload 473 that was successfully received. When the TX lossless engine 740 is provided with this information through line 767, it removes all the LEF payloads 473 stored in the stream buffers 742 and the shared replay buffers 738 with an SSN 488 equal to or less than the SSN 488 provided in the ACK message.

If the RX lossless engine 768 receives a LEF payload 473 including an SSN 488 that is not the next expected SSN 488 (e.g. a LEF payload 473 was lost or received out of order), the target CGRP 402 sends a NACK message that includes the expected next SSN 488 to the source CGRP 402. The TX lossless engine 740 of the source CGRP 402 then retrieves the LEF payload 473 that corresponds to the expected next SSN 488 and resends the LEF payloads 473 from the shared replay buffers 738 starting with the expected next SSN 488. Once all the LEF payloads 473 in the shared replay buffers

738 that are equal to or greater than the expected next SSN 488 received in the NACK message have been resent, the TX lossless engine 740 can resume sending LEF payloads 473 based on transactions stored in the outbound buffers 746-754.

The E-Shim 708 may support flow control of links using PAUSE or PFC frames by utilizing software-controlled static flow-control and adaptive flow-control. The EMAC 710 may send an RX Pause (RXP) signal 723 to the LEF outbound engine 730 of E-Shim 708 which may form a RX Pause Request (RXPR-sometimes called PRQ) signal 735. The LEF inbound engine 760 of E-Shim 708 may form a TX Pause Request (TXPR) signal 771 and send the TXRP signal 771 to the TX pause circuitry 762. The TX pause circuitry 762 may send a TX Pause (TXP-sometimes called TXOFF) signal 761 to EMAC 710 to have it send a pause command over the Ethernet 706.

The E-Shim 708 may implement one or more receive filters. For example, the E-Shim 708 may implement 16 RX filters, such as RX filter 764, which may be prioritized from RX filter 0 to RX filter 15, where RX filter 0 may be the highest priority and RX filter 15 is the lowest. Each RX filter, for example, RX filter 764, may include a software programable mask and match value, each comprising multiple bits. The mask and the match values may allow the software to match and filter on any bits in an Ethernet header 471 of the Ethernet frame 470. If an Ethernet frame 470 matches multiple filters, the highest priority filter may define the action for that Ethernet frame 470. The receive filters may be configured to pass matching Ethernet frames 470 to the E-DMA E-NIC Buffer 778, pass matching Ethernet frames 470 to the RX Lossless Engine 768, drop matching Ethernet frames 470, or pass matching Ethernet frames 470 to both the RX Lossless Engine 768 and the E-DMA E-NIC Buffer 778 to clone Ethernet packets 470 for debug. Each of the RX filters, for example, RX filter 764, may be disabled, enabled for one channel, enabled for two channels, or enabled for any number of channels from the EMAC 710.

The E-DMA outbound logic 756 in E-Shim 708 may initiate an E-DMA transaction to transfer data from memory, such as memory 715, attached to CGRP 702-1 to memory attached to another device on the Ethernet network 706, such as CGRP 702-2. It may initiate a read over TLN 718 to M-Shim 714 to access data in local memory 715. Once that data 444-1 is returned over the TLN 718, an outbound Ethernet frame 470-1 may be generated, including metadata 442-1 and LEF header 474, and transmitted, using EMAC 710 and I/O interface 712, over the Ethernet network 706 to CGRP 702-2.

The LEF outbound engine 730 in the E-Shim 708 may initiate an E-DMA transaction to transfer data in memory attached to another device on the Ethernet network 706, such as CGRP 702-2, to local memory of CGRP 702-1, such as memory 715. The LEF outbound engine 730 may generate a LEF payload 473 including a LEF header 474, metadata 475, data 476, and an FCS/CRC 477. The TX framer 732 of the LEF outbound engine 730 may encapsulate the LEF payload 473 including the generated LEF header 474, the metadata 475, the data 476, and the FCS/CRC 477 into an Ethernet frame 470 to send to the remote device, such as the CGRP 702-2.

The Ethernet frame 470 containing the LEF header 474, the metadata 475, the requested data 476, and the FCS/CRC 477 may be received by the I/O interface 712-2 and passed to the EMAC 710-2 of the remote CGRP 702-2.

The EMAC 710-2 may add the Ethernet frame 470 to the inbound FIFOs 724-2. The EMAC 710-2 may de-queue the Ethernet frame 470 from the head entry of the inbound FIFOs 724-2 and may provide the de-queued Ethernet frame 470 to the LEF inbound engine 760-2 of the E-Shim 708-2 in the remote CGRP 702-2.

The LEF inbound engine 760-2 may extract the LEF header 474, the metadata 475, and the data 476 from the de-queued Ethernet frame 470. The LEF inbound engine 760-2 may generate a TLN write request 450 from the extracted LEF header 474, the metadata 475, and the data 476. The LEF inbound engine 760-2 may transmit the TLN write request 450 over the TLN 718-2 to the M-Shim 714-2 associated with the M-Shim ID 490 in the Ethernet frame 470. The M-Shim 714-2 may use the memory controller 713-2 to perform the TLN write request 450 to transfer the TLN write data 459 associated with the TLN write request 450 to memory 715.

In some implementations, the E-DMA engine 790 may include a read scoreboard to track the non-posted TLN read requests 430 that have been issued to the TLN 718. If the scorecard is full, then no new TLN read requests 430 can be processed. To avoid head of line blocking, the arbiter 780 may not select a transaction from the non-posted buffer if the read scoreboards are full.

The P2P outbound logic 755-1 of the E-Shim 708-1 may also receive outbound P2P packets over the TLN 718-1 from a configurable unit of the configurable units 716-1 in the CGR array 717-1 of the CGRP 702-1. The LEF outbound engine 730-1 may generate outbound Ethernet frames 470 from the outbound P2P packets, and transmit the Ethernet frames 470 to a remote CGRP 702-2.

The E-Shim 708-1 may further receive Ethernet frames 470 from the remote CGRP 702-2, generate inbound P2P packets from the Ethernet frames 470, and transmit the inbound P2P packets over TLN 718-1 to a configurable unit of the configuration units 716-1 in CGR array 717-1 or to the local memory 715-1.

As previously described with reference to FIG. 1, an example dataflow graph may be spread across multiple CGRPs with a first CGRP, for example, CGRP 702-1, configured to execute a first node of the dataflow graph, and another CGRP, for example, CGRP 702-2, configured to execute a second node of the same dataflow graph. The first node may comprise a first set of configurable units 716-1 of the CGR array 717-1 of the CGRP 702-1 and the second node may comprise a second set of configurable units 716-2 of the CGR array 717-2 of the CGRP 702-2.

The first node of the dataflow graph may transmit data to and receive data from the second node of the dataflow graph, and the second node of the dataflow graph may transmit data to and receive data from the first node of the dataflow graph, where the transmission and reception of data between the first and second nodes of the dataflow graph are achieved without passing through a host, such as host 101.

The first set of configurable units 716-1 of the CGR array 717-1 of CGRP 702-1 and the second set of configurable units 716-2 of the CGR array 717-2 of the CGRP 702-2 may each include one or more PMUs 311, one or more PCUs 312, and one or more AGCUs 719, previously described with reference to FIG. 3. The one or more AGCUs 719-1 of the CGRP 702-1 may include a first AGCU 719-1, and the one or more AGCUs 719-2 of CGRP 702-2 may include a second AGCU 719-2.

In one example of operation of the system 700, the first node may perform a first computation on the first set of configurable units 716-1, which may result in data being generated and stored into the memory 715-1 coupled to the CGRP 702-1. In response to the data being generated, the first AGCU 719-1 may send a message over the TLN 718-1 to the E-DMA engine 790-1. The message may indicate that data has been generated and is ready to be transferred from local memory 715-1 coupled to the CGRP 702-1 to the remote memory 715-2 coupled to CGRP 702-2.

The message may trigger the E-DMA engine 790-1 to access a work queue 791 to retrieve the WQE 793-1 at the top of the WQ 791 to determine source and destination addresses for the E-DMA transfer operation. The E-DMA engine 790-1 may use the stream table 798-1 to determine where the source address and the destination address are located as well as what stream the E-DMA transfer operation is a part of. In this example, the source address may be in local memory 715-1 coupled to the CGRP 702-1 and the destination address may be in remote memory 715-2 coupled to the remote CGRP 702-2. This may be referred to as an E-DMA write operation, because from the point of view of the E-DMA engine 790-1, it is writing data to a remote memory 715-2 coupled to the CGRP 702-2.

In response to determining that the WQE 793-1 is an E-DMA write operation and retrieving the address of the data in local memory 715-1, the E-DMA engine 790-1 may then initiate a TLN read request 430 to retrieve the generated data from the local memory 715-1. In some cases, the E-DMA transfer operation may be broken into chunks where each chunk is sized to fit into a LEF payload 473 of an Ethernet frame 470 including data 476, along with the LEF header 474, the metadata 475, and the FCS/CRC 477. Each chunk may be represented by a TX E-DMA descriptor, with its own source address, destination address, and data length.

The E-DMA engine 790 may, for each TX E-DMA descriptor, send a TLN read request 430 over the TLN 718-1 to the local M-Shim 714-1 of the CGRP 702-1, where the TLN read request 430 includes at least a source address 433 for the generated data in memory 715-1 and the data length 435 of the generated data. The local M-Shim 714-1 of CGRP 702-1 may perform the TLN read request 430 using memory controller 713-1 to read the generated data from a contiguous read buffer at the source address 433 in memory 715-1 and return the read data to the E-Shim 702-1 over the TLN 718-1. The read data may be stored into the posted outbound buffer 750-1 of the source CGRP 702-1.

The arbiter 744 selects a transaction from one of the outbound buffers 746-754. In this example, the arbiter 744 selects a transaction from the posted outbound buffer 750-1 that contains the data 449 in the TLN read response 440 associated with the TLN read request 430. The arbiter 744 passes the TLN read response 440 in the posted outbound buffer 750-1 to the TX lossless engine 740. The TX lossless engine 740 adds the LEF header 474, the metadata 475, the data 476, and the FCS/CRC 477 provided by the posted outbound buffer 750-1 to generate the LEF payload 473. The LEF payload 473 is stored into one of the shared replay buffers 738. The arbiter 736 selects from requests to send an Ethernet frame, such as the request from the TX lossless engine 740, an ACK request 765, and a NACK request 766. When the TX lossless engine 740 is selected, it passes LEF payload 473 to the TX framer 732-1.

The TX framer 732-1 of the CGRP 702-1 may generate an Ethernet frame 470 from the LEF payload 473 and information from the stream table 798, such as a MAC address for the destination, such as the MAC address of the EMAC 710-2 of the CGRP 702-2. The Ethernet frame 470 may comprise at least an Ethernet header 471 and the frame payload 472 including the LEF payload 473. The LEF payload 473 includes at least a LEF header 474, metadata 475, data 476, and the FCS/CRC 477. TX framer 732 may use the EMAC 710-1 of the CGRP 702-1 to transfer the Ethernet frame 470 over Ethernet network 706 to the remote CGRP 702-2.

The remote, or destination CGRP 702-2 continues the E-DMA write operation upon receipt of the Ethernet frame 470. For the purposes of this description, the destination CGRP 702-2 is assumed to have the same internal structure as CGRP 702-1, and the next few paragraphs use the same reference numbers to refer to the internal structures of CGRP 702-2 as are shown for CGRP 702-1 in FIGS. 7A, 7B, 7C, and 7D. The EMAC 710-2 of CGRP 702-2 may receive the Ethernet frame 470 from the CGRP 702-1 through the Ethernet network 706. The LEF payload 473 may be extracted from the Ethernet frame 470 and passed through the RX filter 764-2 which determines whether to pass the LEF payload 473 to the RX lossless engine 768-2.

Once the RX lossless engine 768-2 has received the LEF payload 473, it determines whether it has been received in sequence for its stream based on the SSN 488 in the LEF payload 473. If it is in sequence, it updates the register of the most recently received in-sequence SSN 488. The RX lossless engine 768-2 periodically sends an ACK request 765 to the arbiter 736-2 in the LEF outbound engine 730-2 to have an Ethernet frame 470 signifying a positive acknowledgement (an ACK frame) sent back to the sender for a stream that includes the most recently received in-sequence SSN 488. If the LEF payload 473 is out of sequence, the RX lossless engine 768-2 discards the LEF payload 473 and sends a NACK request 766 to the arbiter 736-2 in the LEF outbound engine 730-2 to have an Ethernet frame 470 signifying a negative acknowledgement (a NACK frame) sent back to the sender for a stream that includes a SSN 488 one greater than the most recently received in-sequence SSN 488.

If the LEF payload 473 is in sequence, the RX lossless engine 768-2 stores the metadata 475 and the data 476 of the LEF payload 473 into the appropriate inbound buffer 772-778, depending on the type of transaction received. In this example, the metadata 475 and the data 476 are part of an E-DMA write operation, so they are stored into the posted inbound buffer 774. The arbiter 780 selects between transactions stored in the various inbound buffers 772-778, and in this example selects the transaction from the posted inbound buffer 774. The E-DMA engine 790-2 of CGRP 702-2 uses the metadata 475 of the LEF payload 473 stored in the posted inbound buffer 774 to generate a TLN write request 450 and uses the data 476 of the corresponding LEF payload 473 to generate the TLN write data 459. The E-DMA engine 790-2 sends the generated TLN write request 450 over the request network of TLN 718-2 to the M-Shim 714-2 and sends the generated TLN write data 459 over the data network of the TLN 718-2 to the M-Shim 714-2. The TLN write data 459 is to be written by the memory controller 713-2 into memory 715-2 attached to the CGRP 702-2. When the E-DMA write operation has been completed, the M-Shim 714-2 can send a write completion message over the response network of TLN 718-2 to the E-DMA engine 790-2 of the CGRP 702-2.

Once the WQE 793-1 has been completed, that is all of the data identified for movement by the WQE 793-1 has been moved, the E-DMA engine 790-1 of CGRP 702-1 may send a completion message to another device in the CGRP 702-1 and/or another device in CGRP 702-2 to indicate that the WQE 793-1 has been completed. The device(s) to which a message is to be sent may be indicated in the WQE 793-1. A message to a device in the source CGRP 702-1 may be sent from the E-DMA engine 790-1 over TLN 718-1. A message to a device in the target CGRP 702-2 may be sent as a separate Ethernet frame 470 or included as a flag of the flags 497 in the final Ethernet frame 470 of data for the WQE 793-1. The E-Shim 708-2 in the target CGRP-702-2 can then send a message over its TLN 718-2 to the identified device.

If a completion message is sent to a VAG in an AGCU 719, the AGCU 719 can send a token to a configurable unit 716 in its associated CGR array 717 indicating that WQE has been completed and the configurable unit 716 can continue with further computation. So, for example if the message is sent to a configurable unit 716 in the source CGRP 702-1, it may then begin to overwrite the data that was stored in local memory. As another example, if the message is sent to a configurable unit 716 in the target CGRP 702-2, the configurable unit 716 may begin to utilize the data that has been written to its local memory. This may allow the second node to perform a second computation on the second set of configurable units 716 of CGRP 702-2 based on the availability of the E-DMA data in local memory 715.

If a completion message is sent to another E-Shim, the message may indicate another WQ to activate, causing a new WQE to be read and initiated. In some cases, the same E-Shim may both send and receive the message to allow another WQ in the same E-Shim to be activated.

Runtime software (not shown in FIG. 7) may populate a stream table, such as stream table 798, with stream table entries. The stream table 798 may be stored in local memory in a CGRP, such as CGRP 702-1 or 702-2, or in a memory in the host 101 that is accessible by the CGRPs 702-1 and 702-2. Each stream table entry in the stream table 798 may be associated with a single lossless stream. The single lossless stream may have an associated stream identifier (ID), for example 495 of a corresponding Ethernet frame 470, which may be used as an index into the stream table 798 to access the stream table entry for this lossless stream. In some implementations, an upper section of the physical address is used as the stream ID.

As the LEF outbound engine 730 of CGRP 702-1 processes and frames packets from the outbound engine, such as E-DMA engine 790, it may need to determine these packets Ethernet destination. For requests that may originate on this CGRP 702-1, from an AGCU, such as 719-1 of CGRP 702-1, the E-Shim 708 may also need to evaluate the virtualization controls. For route-through requests that may originate from outside of CGRP 702-1 and passed from another E-Shim of CGRP 702-1 to E-Shim 708, the E-Shim 708 may need to ignore the virtualization controls, which may apply exclusively to transactions that may originate on this CGRP 702-1. For such transactions, the originating CGRP 702 may have already evaluated the virtualization controls before a P2P transaction was transmitted over the Ethernet network 706.

The stream ID may be determined differently depending on the type of transaction. For E-DMA and P2P requests (read or write), the stream ID may be based on an upper portion of the physical destination address. For completion and route-through transactions, the stream ID may be provided by a look-up table in the CGRP 702 using the physical ID of the target CGRP 702 as the index into the table. The table may be pre-programmed for each CGRP 702 by the host.

When a packet is being processed by the LEF outbound engine 730, the LEF outbound engine 730 may access the stream table 798 using the destination stream ID 495 of the Ethernet packet 470 as the index into stream table 798. Each stream table entry in the stream table 798 may have information that the E-Shim 708 may need to use to construct an Ethernet frame 470 for this stream. The information in each stream table entry may include one or more of a destination CGRP ID, a destination MAC address, a source MAC address, Ethernet controls, specific frame type information, and a stream protection bit. The specific frame type information may include for IP/UDP and VxLAN frames a destination IPv4 address, a destination UDP port number, a source IPv4 address, and a source UDP port number, for VxLAN frames a VxLAN identifier (VNI), and for MPLS frames a label and a traffic class (TC). The E-Shim 708 may provide additional information that may be needed to construct the frame.

A CGRP may be configured to implement artificial intelligence (AI) algorithms that use billions of operands. It follows that each mathematical operation used in AI may involve an immense number of operands. An example of such an operation is the multiplication of very large matrices as may be required for artificial intelligence applications. The outputs of one large scale mathematical operation (e.g., matrix multiplication, vector products, etc.) may be the inputs to a second large scale mathematical operation. For example, one large scale mathematical operation may be a vector outer product that requires one or more processors to execute a loop in which sequences operands are read from sequential memory locations and the results written to sequential memory locations. DMA operations may be used to copy the results from their current location to another memory location for use in a second large scale mathematical operation. Those familiar with high performance computing are familiar with DMA operations such as DMA block transfer operations that may be implemented using established technologies like InfiniBand remote DMA (RDMA), RDMA over converged ethernet (RoCE), etc.

The mathematical operations often include the same read-calculate-copy sequence using the exact same set of memory locations. The read-calculate-copy sequence may read thousands of input values into thousands of memory locations in a local memory, loop through those memory locations while writing the output results to thousands of other memory locations in the local memory, and then copy the results from the local memory to a second memory for use by a subsequent operation. The read and copy aspects of the sequence often includes a series of DMA operations. As such, the read-calculate-copy sequence may be more accurately described as a DMA in-calculate-DMA out sequence. A DMA engine (e.g., E-DMA engine 790) may copy the results to the second memory by processing a series of WQEs that are stored in a WQ. The WQEs may be DMA block transfer WQEs that each instruct the DMA engine to transfer a block of the results to the second memory. In the past, DMA block transfer WQEs have been written to the WQ every time a set of results is produced. The DMA engine then processes the WQEs and thereby copies the results to the second memory. It has been observed that the DMA block transfer WQEs are often the same for a series of DMA in-calculate-DMA out sequences. As such, a technique has been developed for reusing DMA block transfer WQEs such that new DMA transfer WQEs are not required for every read-calculate-write sequence. The technique involves using "jump wait WQEs" to implement loops such that the DMA engine may process a series of WQEs to copy a first set of results from specific local memory locations and then loop back and process those same WQEs again when a second set of results is available in those specific local memory locations.

Figure 8A:
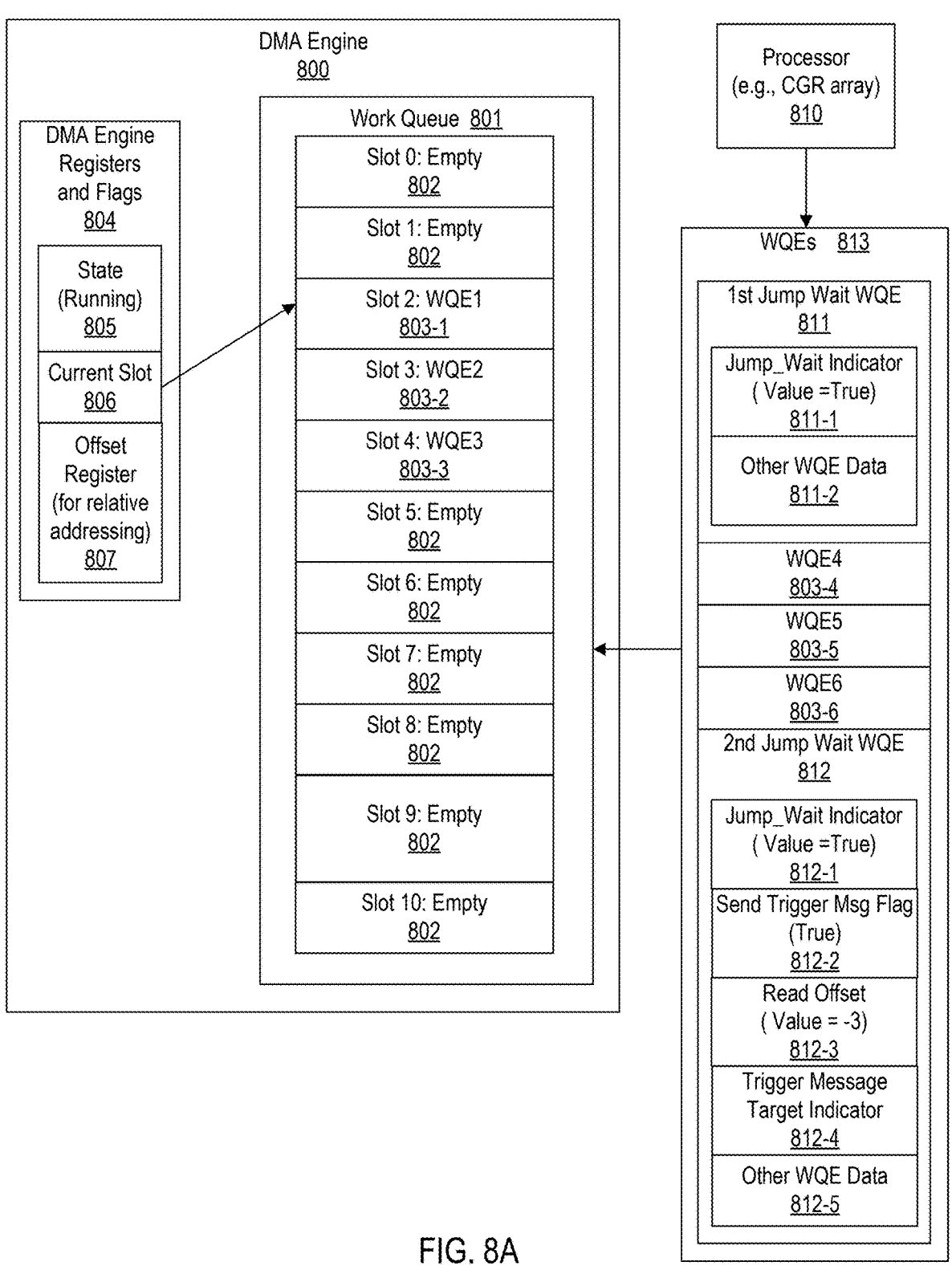
FIG. 8A is a high level conceptual diagram illustrating an example of a processor writing work queue entries (WQEs) into a work queue (WQ) that is being processed by a DMA engine, according to some aspects.

FIG. 8A is a high level conceptual diagram illustrating an example of a processor 810 writing work queue entries (WQEs) 813 into a work queue (WQ) 801 that is being processed by a DMA engine 800, according to some aspects. The processor 810 may be a CGR array such as CGR array 201. The E-DMA engine 790 may be an example of the DMA engine 800. The WQ 801 may store WQEs such as WQE1 803-1, WQE2 803-2, and WQE3 803-3. The WQ 801 may also have empty slots 802 where WQEs may be stored. The DMA engine may process the WQ by processing a WQE and then processing the next WQE in the WQ. The DMA engine may have registers and flags 804 such as the state register 805, a current slot register 806, and an offset register 807 that may hold a value for identifying a slot value relative to the current slot. The state register 805 (in some examples, the state may be indicated by a flag in a register) indicates that the DMA engine 800 is in the "running" state in FIG. 8A. The current slot register 806 indicates the current slot. The current slot stores the WQE being processed, called the current WQE. The offset register 807 may hold a value for identifying a slot value relative to the current slot. In FIG. 8A, the current slot register indicates that slot 2 is storing the current WQE, WQE1 803-1. As such, the DMA engine is currently performing the operation (e.g., an EDMA block transfer) indicated by WQE1 803-1.

The WQ 801 may store WQEs 813 sent by the processor 810 to the DMA engine 800. The WQEs 813 may include a first jump wait WQE 811, WQE4 803-4, WQE5 803-5, WQE6 803-6, and a second jump wait WQE 812. The first jump wait WQE 811 includes a jump-wait indicator 811-1 that is set (e.g., value=true), and other WQE data 811-2. The second jump wait WQE 812 includes a jump-wait indicator 812-1 that is set (e.g., value=true), a send trigger message flag 812-2 that is set (e.g., value=true), a read offset 812-3 having a value of −3, a trigger message target indicator 812-4, and other WQE data 812-5. Jump-wait indicators may indicate whether the DMA engine should enter a jump_pause state in response to processing a jump wait WQE. The send trigger message flag 812-2 may indicate that the DMA engine 800 should send an outgoing trigger message containing the read offset 812-3 to the target indicated by the trigger message target indicator 812-4. The jump indicated by a trigger message may be absolute (e.g., a read offset value of 2 indicates a jump to slot 2) or may be relative (e.g., a read offset value of 2 indicates jump forward by 2 slots). Those practiced in the art know numerous other ways to indicate the destination of a jump.

Figure 8B:
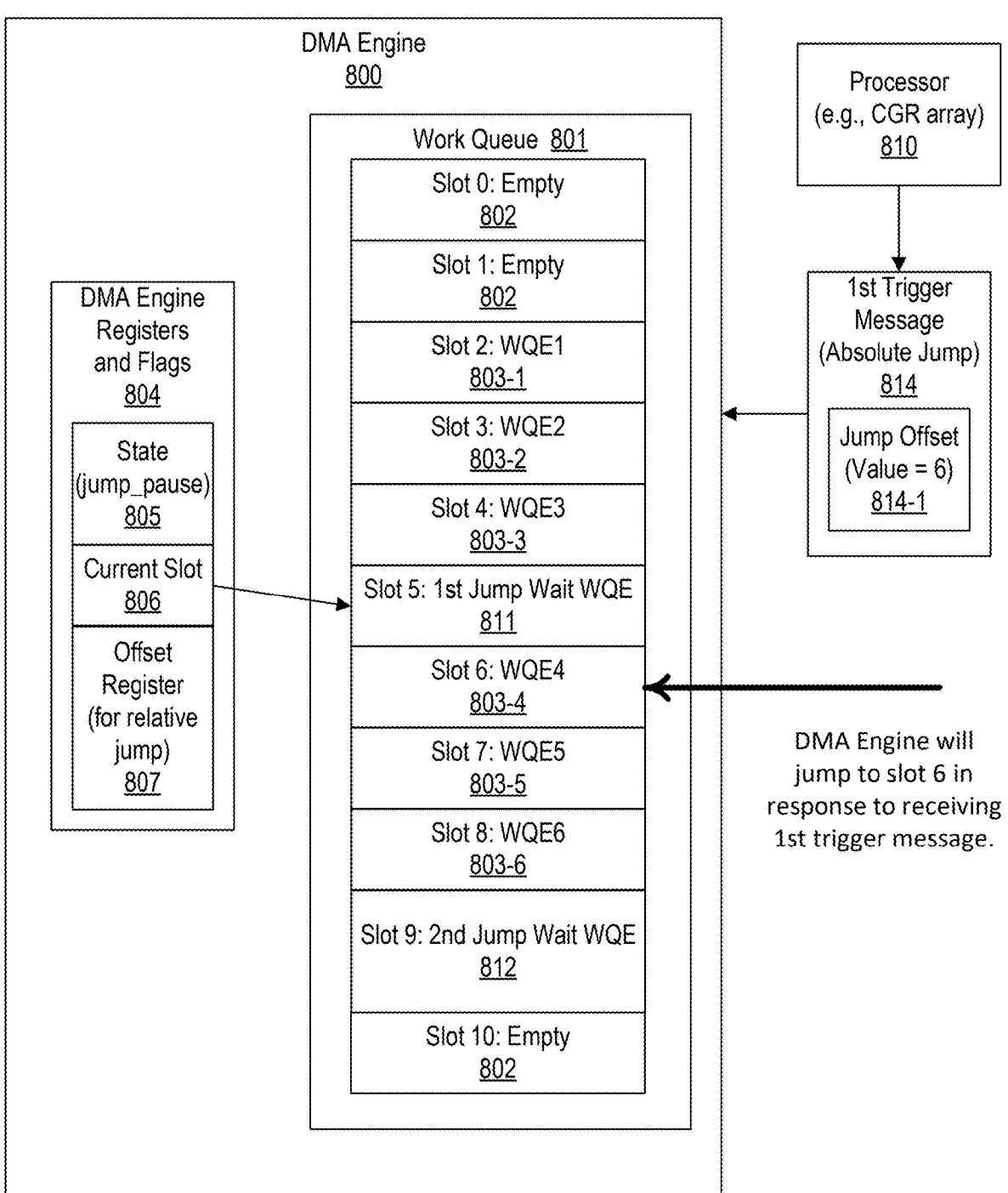
FIG. 8B is a high level conceptual diagram illustrating the DMA engine illustrated in FIG. 8A in a jump_pause state, according to some aspects.

FIG. 8B is a high level conceptual diagram illustrating the DMA engine illustrated in FIG. 8A in a jump_pause state, according to some aspects. Here, the DMA engine has processed WQE1 803-1, then processed WQE2 803-2, then processed WQE3 803-3, and then processed the first jump wait WQE 811. The first jump wait WQE 811 includes a jump_wait indicator 811-1 that is set (e.g., value=true), as such the DMA engine has entered the jump_pause state. The DMA engine has paused operation and is waiting for a trigger message. The trigger message may come from any source that can send messages to the DMA engine. Here, the processor 810 is sending a first trigger message 814 to the DMA engine 800. The first trigger message includes a jump offset field 814-1 having a value of 6. The DMA engine may respond to the first trigger message 814 by determining which WQ slot to jump to. For example, the jump offset field 814-1 of the first trigger message 814 has a value of 6 and the jump is an absolute jump. The DMA engine may jump to slot 6 because the jump offset equals 6. In some examples, the trigger message may indicate (e.g., via a flag) whether the jump is absolute or relative. In other examples, all jumps are absolute. In further examples, all jumps are relative. To provide a comprehensive description, the example illustrated in FIGS. 8A-8F may implement absolute jumps or relative jumps.

Figure 8C:
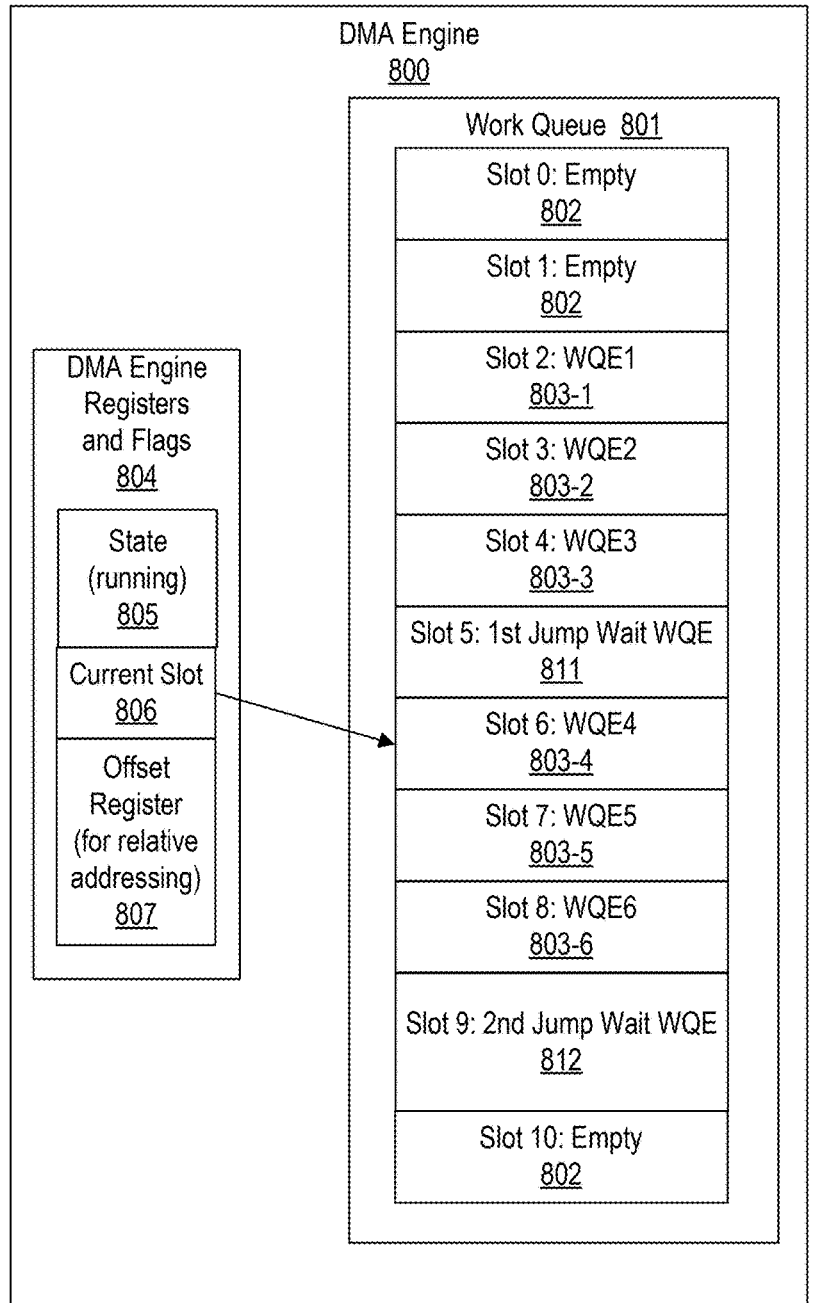
FIG. 8C is a high level conceptual diagram illustrating the DMA engine illustrated in FIG. 8A in a run state after exiting the jump_pause state in response to receiving a first trigger message, according to some aspects.

FIG. 8C is a high level conceptual diagram illustrating the DMA engine 800 illustrated in FIG. 8A in a run state after exiting the jump_pause state in response to receiving the first trigger message 814, according to some aspects. The DMA engine is processing WQE4 803-4 after jumping to slot 6 and entering the running state in response to receiving the first trigger message 814.

Figure 8D:
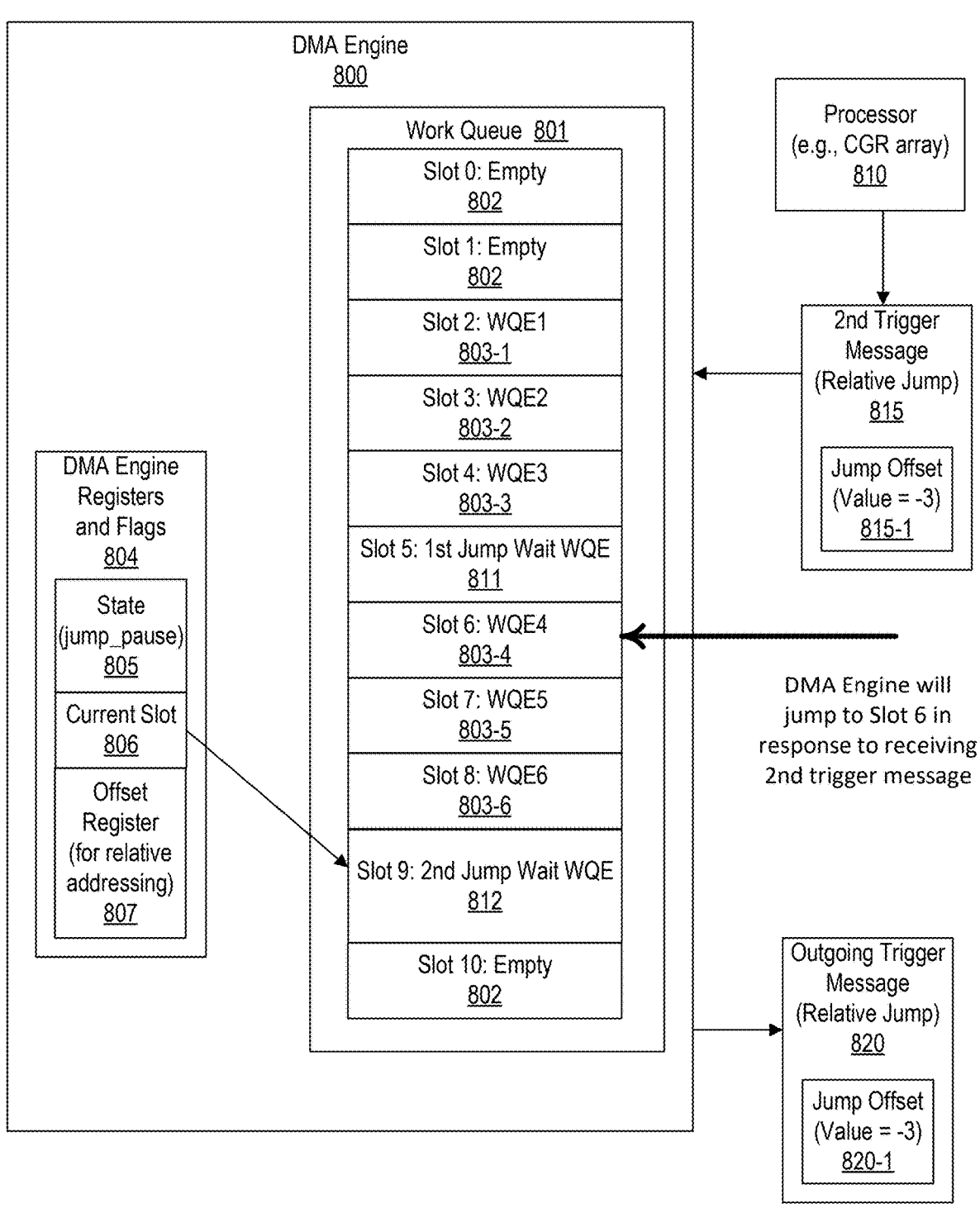
FIG. 8D is a high level conceptual diagram illustrating the DMA engine illustrated in FIG. 8A in the jump_pause state and waiting for a second trigger message, according to some aspects.

FIG. 8D is a high level conceptual diagram illustrating the DMA engine illustrated in FIG. 8A in the jump_pause state and waiting for a second trigger message, according to some aspects. Here, the DMA engine 800 has jumped to slot 6, processed WQE4 803-4, then processed WQE5 803-5, then processed WQE6 803-6, and then processed the second jump wait WQE 812. The second jump wait WQE 812 includes a jump-wait indicator 812-1 that is set (e.g., value=true), as such the DMA engine has entered the jump_pause state and is waiting for a trigger message. The trigger message may come from any source that can send messages to the DMA engine. Here, the processor 810 is sending a second trigger message 815 to the DMA engine 800. The second trigger message 815 is for a relative jump and includes a jump offset field 815-1 having a value of −3. The DMA engine may respond to the second trigger message 815 by determining which WQ slot to jump to. For example the DMA engine may jump backward three slots (to the slot currently storing WQE4) because the jump offset equals −3.

FIG. 8D shows the DMA engine sending an outgoing trigger message 820. The second jump wait WQE 812 includes a send trigger message flag 812-2 that is set to true. As such, the DMA engine has sent the outgoing trigger message 820 to the target indicated by the trigger message target indicator 812-4. The second jump wait WQE 812 includes a read offset 812-3 that equals −3, as such the outgoing trigger message 820 includes a jump offset 820-1 of −3. The target to which the outgoing trigger message is sent may be any DMA engine, WQ, processor, etc. that is configured to receive trigger messages. In some examples, the DMA engine 800 may send an outgoing trigger message to itself.

Figure 8E:
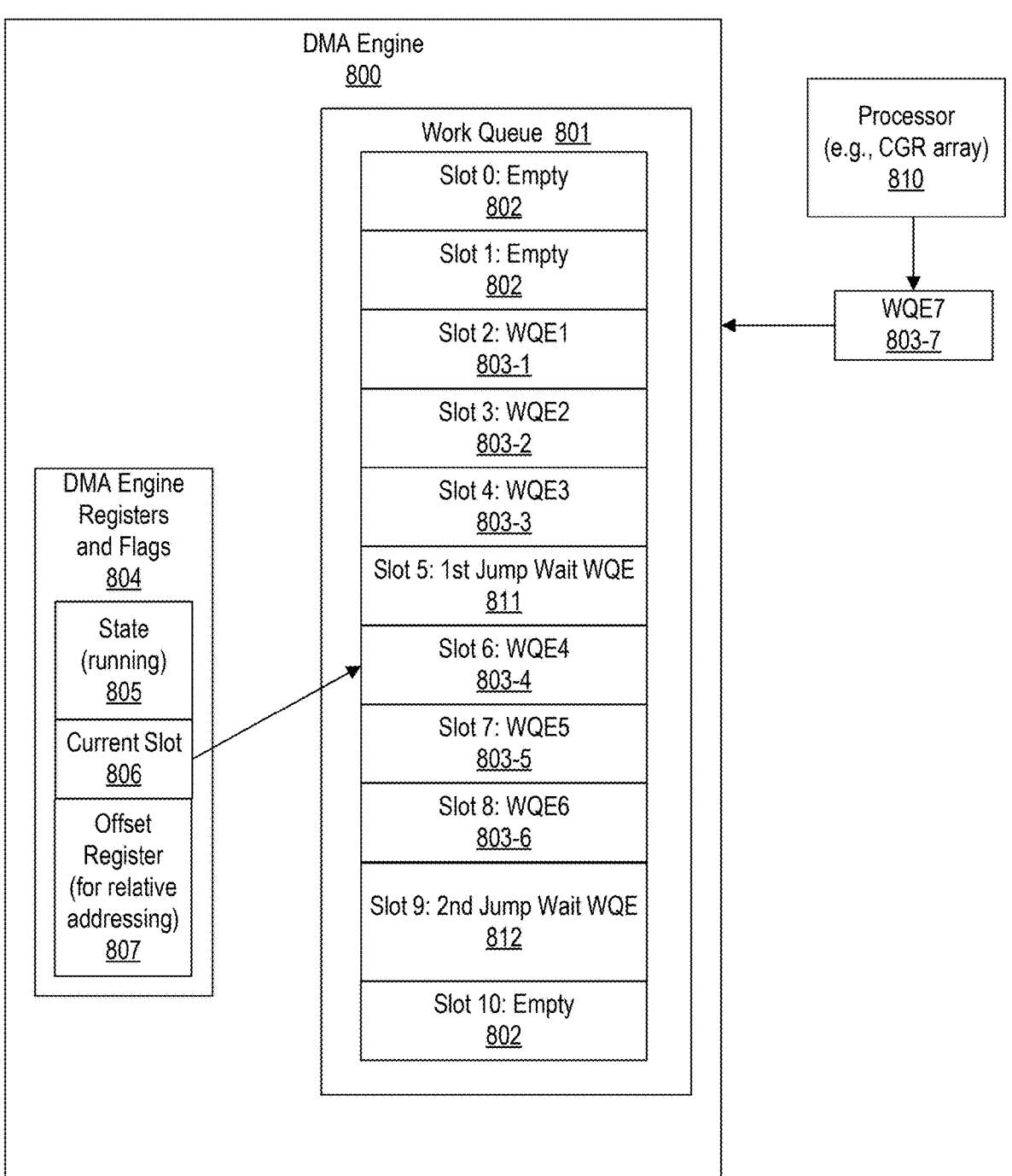
FIG. 8E is a high level conceptual diagram illustrating the DMA engine illustrated in FIG. 8A in a run state after exiting the jump_pause state in response to receiving the second trigger message, according to some aspects.

FIG. 8E is a high level conceptual diagram illustrating the DMA engine illustrated in FIG. 8A in a run state after exiting the jump_pause state in response to receiving the second trigger message, according to some aspects. The DMA engine 800 is processing WQE4 803-4 after jumping to slot 6 and entering the running state in response to receiving the second trigger message 815. The processor 810 has also sent WQE7 803-7 to the DMA engine.

Figure 8F:
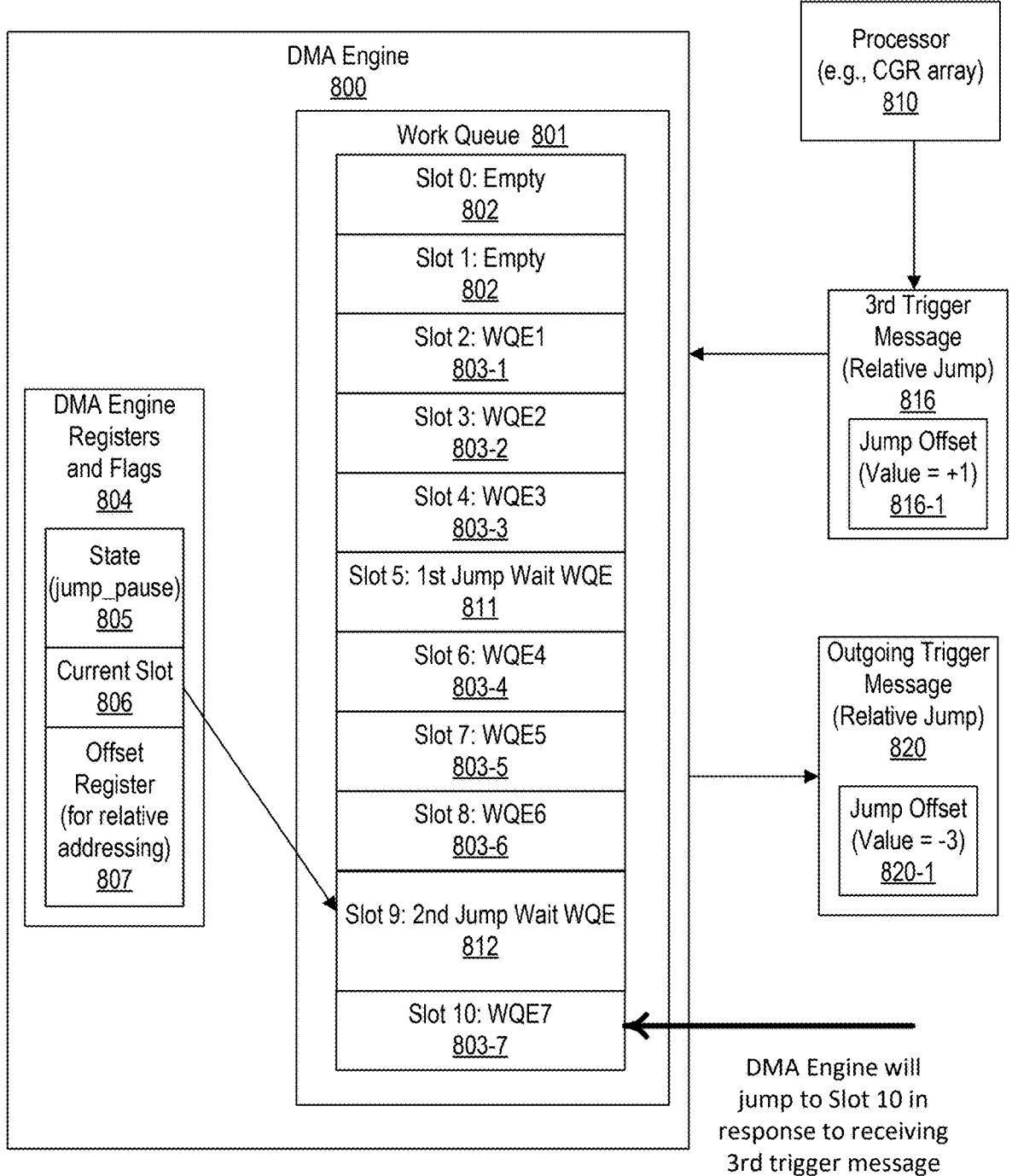
FIG. 8F is a high level conceptual diagram illustrating the DMA engine illustrated in FIG. 8A in the jump_pause state and waiting for a third trigger message, according to some aspects.

FIG. 8F is a high level conceptual diagram illustrating the DMA engine illustrated in FIG. 8A in the jump_pause state and waiting for a third trigger message, according to some aspects. Here, the DMA engine 800 has jumped to slot 6, then processed WQE4 803-4, then processed WQE5 803-5, then processed WQE6 803-6, and then processed the second jump wait WQE 812. The second jump wait WQE 812 includes a jump-wait indicator 812-1 that is set (e.g., value=true), as such the DMA engine has entered the jump_ pause state. The DMA engine has paused operation and is waiting for a trigger message. The trigger message may come from any source that can send messages to the DMA engine. Here, the processor 810 is sending a third trigger message 816 to the DMA engine 800. The third trigger message 816 is for a relative jump and includes a jump offset field 816-1 having a value of +1. The DMA engine may respond to the third trigger message 816 by determining which WQ slot to jump to. As such, the DMA engine may jump forward one slot (to the slot currently storing WQE7) because the jump offset equals +1. As in FIG. 8D, FIG. 8F shows the DMA engine sending an outgoing trigger message 820.

Figure 9:
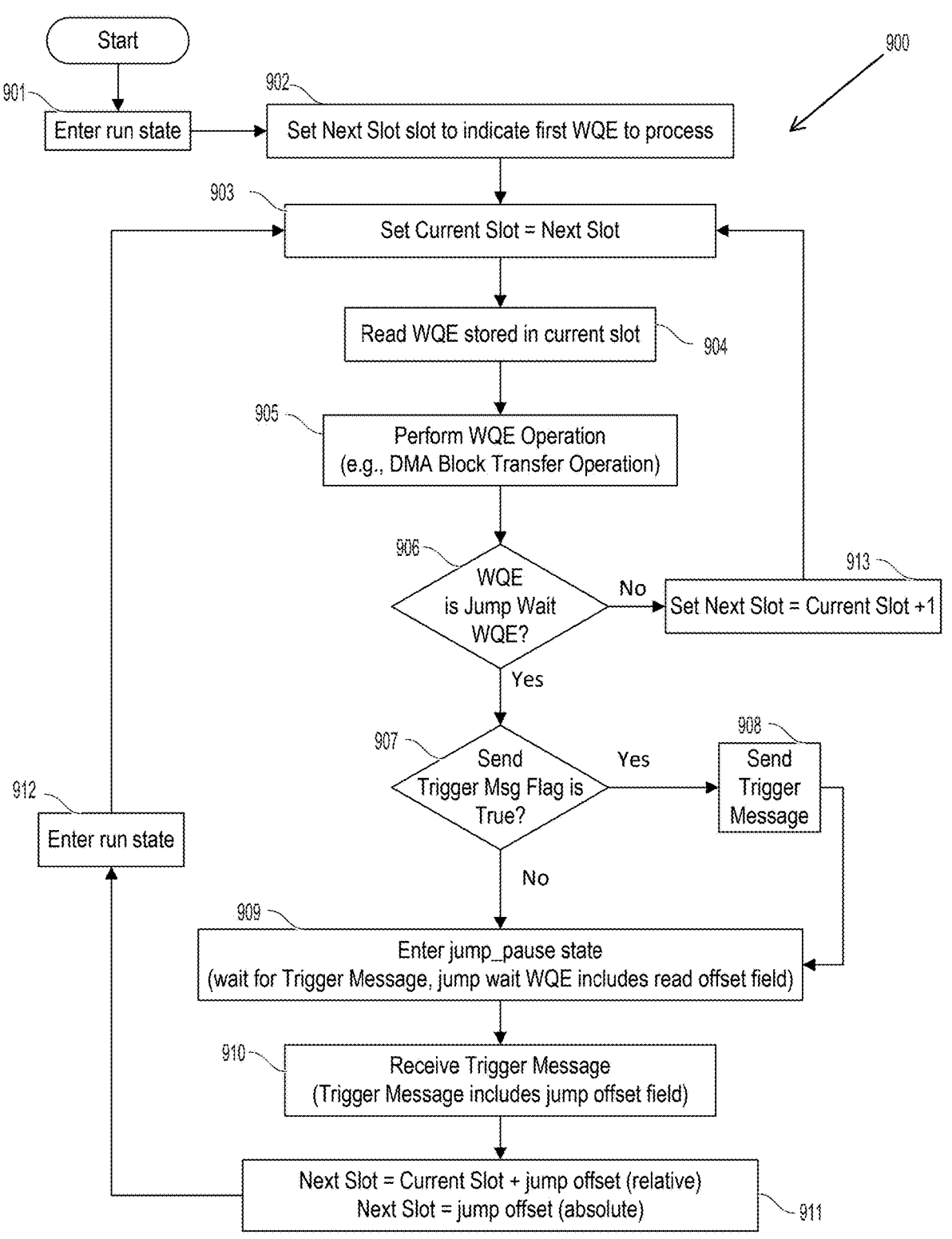
FIG. 9 is a high level flow diagram illustrating an example of a process that may be implemented by a DMA engine, in accordance with some aspects.

FIG. 9 is a high level flow diagram illustrating an example of a process 900 that may be implemented by a DMA engine, in accordance with some aspects. After the start, the DMA engine enters the run state 901 at block 901. At block 902, the value of next slot may be set to indicate the first WQE in the WQ that is to be processed. At block 903, current slot is set to the next slot value. At block 904, the WQE stored in the current slot is read. At block 905, the WQE operation is performed (e.g., perform a DMA bulk transfer). At decision block 906, the WQE is checked to see if it is a jump wait WQE. If the WQE is a jump wait WQE at decision block 906 then the process moves to block 907 and otherwise moves to block 913 before looping back to block 903. At decision block 907, the WQE is checked to see if the WQE indicates that a trigger message should be sent (e.g., send trigger message flag is true). If the WQE indicates that a trigger message should be sent at decision block 907 then the process moves to block 908 and otherwise moves to block 909. At block 908, a trigger message is sent. At block 909, the DMA engine may enter the jump_pause state in which the DMA engine is paused and waiting for a trigger message. Here, the DMA engine is paused in response to processing the jump wait WQE. At block 910 the DMA engine may receive a trigger message. As discussed above, the trigger message may include a jump offset. For brevity, the term "trigger message" is used here to indicate a message that indicates that the DMA engine may exit the jump_pause state and enter the running state. While in the jump_pause state, the DMA engine may ignore trigger messages that do not indicate that the DMA engine may exit the jump_pause state. A trigger message may indicate that the DMA engine may exit the jump_pause state and enter the running state by having one or more specific values in specific fields (e.g., a specific message type indicator, having a value in the jump offset field, etc.). At block 911, the DMA engine may identify which WQE should be processed next. In an example, the DMA engine may perform a relative jump by setting next slot to the sum of the current slot number and the jump offset in the trigger message. In another example, the DMA engine may perform an absolute jump by setting next slot to the jump offset in the trigger message. As such, DMA engine may identify the next slot and thereby determine that the WQE in the next slot is the next WQE to process. At block 912, the DMA engine may enter the run state before looping back to block 903.

FIG. 10 is a high level flow diagram illustrating an example of a method for looping dynamic memory access operations 1000, according to some aspects. The method may be implemented by a DMA engine such as E-DMA engine 790. At block 1002, a work queue element (WQE) may be read. The WQE may be in a work queue configured to store a plurality of WQEs. At block 1004, a jump_pause state may be entered in response to processing the WQE and determining that a jump_wait indicator in the WQE is set. At block 1006, a jump offset included in a trigger message may be used to identify a one of the WQEs in response to receiving the trigger message. At block 1008, a run state may be entered in response to receiving the trigger message. An aspect of entering the run state may be to begin processing the one of the WQEs.

Figure 11:
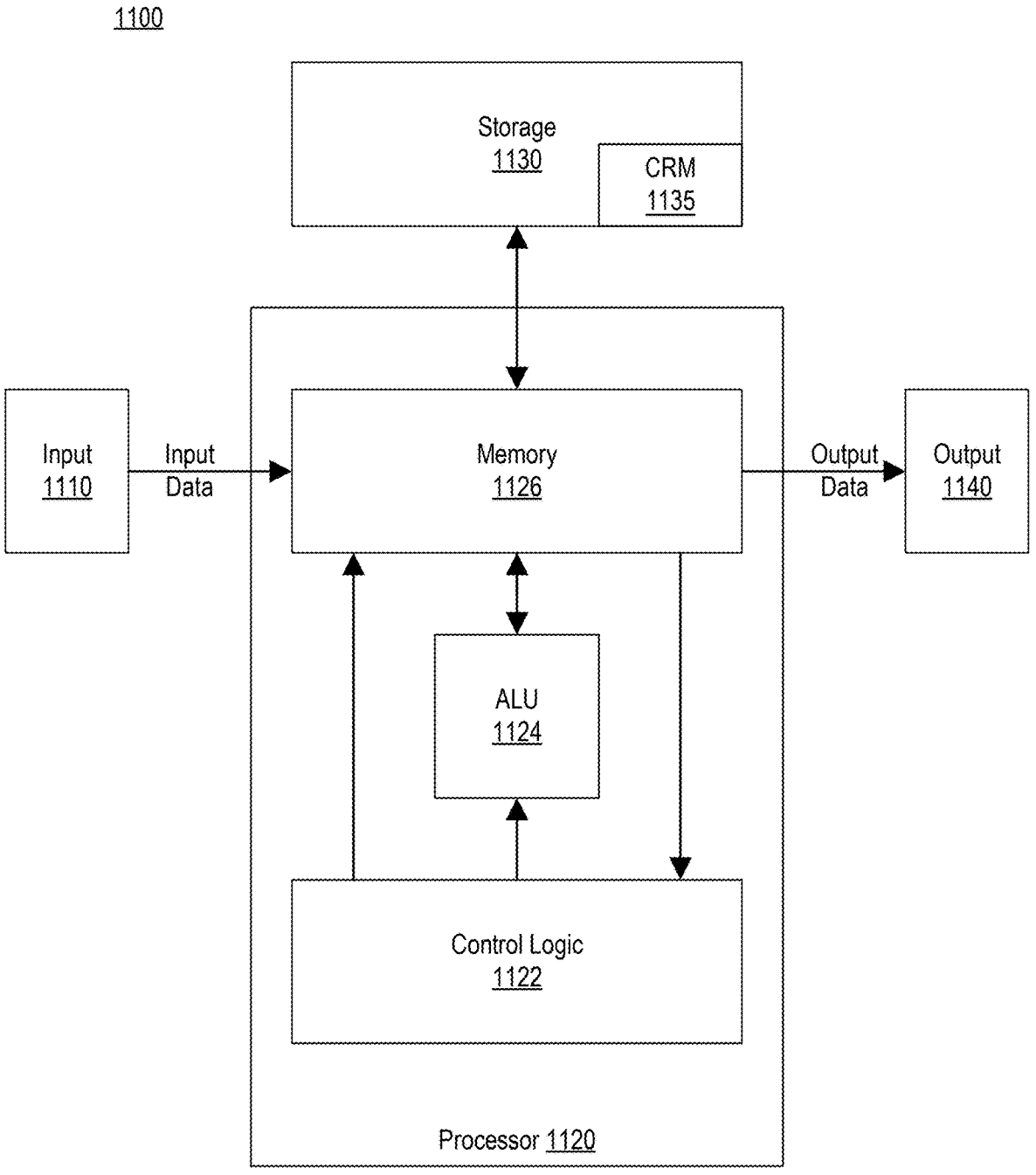
FIG. 11 illustrates an example of a computer, including an input device, a processor, a storage device, and an output device, according to some aspects.

FIG. 11 illustrates an example of a computer 1100, including an input device 1110, a processor 1120, a storage device 1130, and an output device 1140, according to some aspects. Although the example computer 1100 is drawn with a single processor, other implementations may have multiple processors. Input device 1110 may comprise a mouse, a keyboard, a sensor, an input port (for example, a universal serial bus (USB) port), and any other input device known in the art. Output device 1140 may comprise a monitor, printer, and any other output device known in the art. Furthermore, part or all of input device 1110 and output device 1140 may be combined in a network interface. Input device 1110 is coupled with processor 1120 to provide input data, which an implementation may store in memory 1126. Processor 1120 is coupled with output device 1140 to provide output data from memory 1126 to output device 1140. Processor 1120 further includes control logic 1122, operable to control memory 1126 and arithmetic and logic unit (ALU) 1124, and to receive program and configuration data from memory 1126. Control logic 1122 further controls exchange of data between memory 1126 and storage device 1130. Memory 1126 typically comprises memory with fast access, such as static random-access memory (SRAM), whereas storage device 1130 typically comprises memory with slow access, such as dynamic random-access memory (DRAM), flash memory, magnetic disks, optical disks, and any other memory type known in the art. At least a part of the memory in storage device 1130 includes a non-transitory computer-readable medium (CRM 1135), such as used for storing computer programs.

Described implementations of the subject matter can include one or more features, alone or in combination.

In an example, the subject matter described in this disclosure may be implemented by a system. The system may include a DMA engine configured to process a work queue (WQ) that is configured to store a plurality of work queue elements (WQEs), and a processor configured to write a work queue element (WQE) to the WQ, the WQE including a jump_wait indicator, wherein the DMA engine is configured to enter a jump_pause state in response to processing the WQE and determining that the jump_wait indicator is set, the DMA engine is configured to identify a one of the WQEs based at least in part on a jump offset in a trigger message, the DMA engine is configured to enter a run state and to begin processing the one of the WQEs in response to receiving the trigger message, and the DMA engine is configured to transfer a block of data between a memory and a network interface in response to processing the one of the WQEs.

The foregoing and other described examples may each, optionally, include one or more of the following features:

A first feature, combinable with any of the following features, wherein the DMA engine is configured to process the WQ while in the run state by sequentially processing the WQEs in the WQ.

A second feature, combinable with any of the previous or following features, wherein the DMA engine is configured to send an outgoing trigger message in response to determining that the WQE includes a read offset.

A third feature, combinable with any of the previous or following features, is an E-shim that includes the DMA engine, wherein the E-shim is connected to the network interface and to a top level network (TLN), the E-shim is configured to communicate with a second E-shim via the network interface, and the E-shim is configured to write blocks of data to the memory via the TLN.

A fourth feature, combinable with any of the previous or following features, is an M-shim connected to the TLN and to a memory controller, wherein the M-shim is configured to receive the blocks of data via the TLN and to write the blocks of data to the memory via the memory controller.

A fifth feature, combinable with any of the previous or following features, wherein a course-grained reconfigurable (CGR) processor (CGRP) includes an E-shim, an M-shim, and a TLN.

A sixth feature, combinable with any of the previous or following features, is an M-shim configured to communicate with the DMA engine via a top level network (TLN) and to communicate with the memory via a memory controller, wherein the M-shim is configured to receive blocks of data via the TLN and to write the blocks of data to the memory via the memory controller.

A seventh feature, combinable with any of the previous or following features, wherein the processor includes a course-grained reconfigurable (CGR) array.

An eighth feature, combinable with any of the previous or following features, is a top level network (TLN) that includes a first TLN switch, and an M-shim connected to the TLN and connected to the memory via a memory controller, wherein the CGR array is configured to access the memory via the first TLN switch.

A ninth feature, combinable with any of the previous or following features, is a top level network (TLN) that includes a second TLN switch, and an E-shim connected to the TLN, wherein the E-shim includes the DMA engine, and the CGR array is configured to access the DMA engine via the second TLN switch.

A tenth feature, combinable with any of the previous or following features, is a first TLN switch, and an M-shim connected to the TLN and connected to the memory via a memory controller, wherein the CGR array is configured to access the memory via the first TLN switch.

A eleventh feature, combinable with any of the previous or following features, wherein the DMA engine is configured to communicate with the memory via the first TLN switch and the second TLN switch.

A twelfth feature, combinable with any of the previous or following features, is a CGR processor (CGRP) that includes the E-shim, the M-shim, the TLN, and the CGR array.

A thirteenth feature, combinable with any of the previous or following features, wherein the CGRP is configured to implement the WQ.

In another example, the subject matter described in this disclosure may be implemented by a coarse-grained reconfigurable (CGR) processor (CGRP). The CGRP may include a DMA engine configured to process a work queue (WQ) that is configured to store a plurality of work queue elements (WQEs), and a processor coupled configured to write a work queue element (WQE) to the WQ, the WQE including a jump_wait indicator, wherein the DMA engine is configured to enter a jump_pause state in response to processing the WQE and determining that the jump_wait indicator is set, the DMA engine is configured to identify a one of the WQEs based at least in part on a jump offset in a trigger message, and the DMA engine is configured to enter a run state and to begin processing the one of the WQEs in response to receiving the trigger message.

The foregoing and other described examples may each, optionally, include one or more of the following features:

A first feature, combinable with any of the following features, wherein the DMA engine is configured to send an outgoing trigger message in response to determining that the WQE includes a read offset.

In yet another example, the subject matter described in this disclosure may be implemented by a method. The method may include reading a work queue element (WQE) that is in a work queue configured to store a plurality of WQEs, entering a jump_pause state in response to processing the WQE and determining that a jump_wait indicator in the WQE is set, using a jump offset included in a trigger message to identify a one of the WQEs in response to receiving the trigger message, and entering a run state and beginning to process the one of the WQEs in response to receiving the trigger message.

The foregoing and other described examples may each, optionally, include one or more of the following features:

A first feature, combinable with any of the following features, wherein the DMA engine is configured to transfer a block of data between a memory and a network interface in response to processing the one of the WQEs.

A second feature, combinable with any of the previous or following features, wherein the DMA engine is configured to process the WQ while in the run state by sequentially processing the WQEs in the WQ.

A third feature, combinable with any of the previous or following features, wherein the DMA engine is configured to send an outgoing trigger message in response to determining that the WQE includes a read offset.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile CGR array/non-volatile CGR array memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback such as visual, auditory, or a combination of feedback types. Input from the user can be received in any form, including acoustic, speech, or other types of input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship with each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system comprising:
a direct memory access (DMA) engine configured to process a work queue (WQ) that is configured to store a plurality of work queue elements (WQEs); and
a processor configured to write a work queue element (WQE) to the WQ, the WQE including a jump_wait indicator;
wherein:
the DMA engine is configured to enter a jump_pause state in response to processing the WQE and determining that the jump_wait indicator is set;
the DMA engine is configured to identify one of the WQEs based at least in part on a jump offset in a trigger message;
the DMA engine is configured to enter a run state and to begin processing the one of the WQEs in response to receiving the trigger message; and
the DMA engine is configured to transfer a block of data between a memory and a network interface in response to processing the one of the WQEs.

2. The system of claim 1, wherein:
the DMA engine is configured to process the WQ while in the run state by sequentially processing the WQEs in the WQ.

3. The system of claim 1, wherein:
the DMA engine is configured to send an outgoing trigger message in response to determining that the WQE includes a read offset.

4. The system of claim 1, further including:

an E-shim that includes the DMA engine, wherein:

the E-shim is connected to the network interface and to a top level network (TLN);

the E-shim is configured to communicate with a second E-shim via the network interface; and the E-shim is configured to write blocks of data to the memory via the TLN.

5. The system of claim 4, further including:

an M-shim connected to the TLN and to a memory controller, wherein the M-shim is configured to receive the blocks of data via the TLN and to write the blocks of data to the memory via the memory controller.

6. The system of claim 1 wherein a coarse-grained reconfigurable (CGR) processor (CGRP) includes an E-shim, an M-shim, and a TLN.

7. The system of claim 1 further including:

an M-shim configured to communicate with the DMA engine via a top level network (TLN) and to communicate with the memory via a memory controller, wherein the M-shim is configured to receive blocks of data via the TLN and to write the blocks of data to the memory via the memory controller.

8. The system of claim 1 wherein the processor includes a coarse-grained reconfigurable (CGR) array.

9. The system of claim 8 further including:

a top level network (TLN) that includes a first TLN switch; and an M-shim connected to the TLN and connected to the memory via a memory controller, wherein the CGR array is configured to access the memory via the first TLN switch.

10. The system of claim 8 further including:

a top level network (TLN) that includes a second TLN switch; and an E-shim connected to the TLN, wherein:

the E-shim includes the DMA engine; and the CGR array is configured to access the DMA engine via the second TLN switch.

11. The system of claim 10 further including:

a first TLN switch; and an M-shim connected to the TLN and connected to the memory via a memory controller, wherein the CGR array is configured to access the memory via the first TLN switch.

12. The system of claim 11 wherein the DMA engine is configured to communicate with the memory via the first TLN switch and the second TLN switch.

13. The system of claim 11 further including a CGR processor (CGRP) that includes the E-shim, the M-shim, the TLN, and the CGR array.

14. The system of claim 13 wherein the CGRP is configured to implement the WQ.

15. A coarse-grained reconfigurable (CGR) processor (CGRP) comprising:

a direct memory access (DMA) engine configured to process a work queue (WQ) that is configured to store a plurality of work queue elements (WQEs); and a processor configured to write a work queue element (WQE) to the WQ, the WQE including a jump_wait indicator, wherein:

the DMA engine is configured to enter a jump_pause state in response to processing the WQE and determining that the jump_wait indicator is set;

the DMA engine is configured to identify one of the WQEs based at least in part on a jump offset in a trigger message; and the DMA engine is configured to enter a run state and to begin processing the one of the WQEs in response to receiving the trigger message.

16. The CGRP of claim 15 wherein:

the DMA engine is configured to send an outgoing trigger message in response to determining that the WQE includes a read offset.

17. A method implemented by a direct memory access (DMA) engine, the method comprising:

reading a work queue element (WQE) that is in a work queue configured to store a plurality of WQEs;

entering a jump_pause state in response to processing the WQE and determining that a jump_wait indicator in the WQE is set;

using a jump offset included in a trigger message to identify one of the WQEs in response to receiving the trigger message; and entering a run state and beginning to process the one of the WQEs in response to receiving the trigger message.

18. The method of claim 17, wherein:

the DMA engine is configured to transfer a block of data between a memory and a network interface in response to processing the one of the WQEs.

19. The method of claim 17, wherein:

the DMA engine is configured to process the WQ while in the run state by sequentially processing the WQEs in the WQ.

20. The method of claim 17 wherein:

the DMA engine is configured to send an outgoing trigger message in response to determining that the WQE includes a read offset.

* * * * *